US012730190B2

(12) United States Patent
Wekel et al.

(10) Patent No.: US 12,730,190 B2
(45) **Date of Patent: *Sep. 8, 2026**

(54) OBJECT DETECTION AND CLASSIFICATION

(71) Applicant: NVIDIA Corporation, Santa Clara, CA (US)

(72) Inventors: Tilman Wekel, Sunnyvale, CA (US); Sangmin Oh, San Jose, CA (US); David Nister, Bellevue, WA (US); Joachim Pehserl, Lynnwood, WA (US); Neda Cvijetic, East Palo Alto, CA (US); Ibrahim Eden, Redmond, WA (US)

(73) Assignee: NVIDIA Corporation, Santa Clara, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 18/531,103

(22) Filed: Dec. 6, 2023

(65) Prior Publication Data

US 2024/0111025 A1 Apr. 4, 2024

Related U.S. Application Data

(63) Continuation of application No. 17/005,788, filed on Aug. 28, 2020, now Pat. No. 11,906,660.

(Continued)

(51) Int. Cl.

*G01S 7/00* (2006.01)
*G01S 7/48* (2006.01)

(Continued)

(52) U.S. Cl.

CPC ............ *G01S 7/4802* (2013.01); *G01S 7/481* (2013.01); *G01S 17/894* (2020.01);

(Continued)

(58) Field of Classification Search

CPC ...... G01S 7/4802; G01S 7/481; G01S 17/894; G01S 17/931; G01S 7/28;

(Continued)

(56) References Cited

U.S. PATENT DOCUMENTS 9,098,754 B1 * 8/2015 Stout ......................... G06T 7/70
10,885,698 B2 1/2021 Stout et al.

(Continued)

OTHER PUBLICATIONS

He et al, Mask R-CNN, ICCV (Year: 2017).*

(Continued)

*Primary Examiner* — Xiao Liu
(74) *Attorney, Agent, or Firm* — IRON SUMMIT IP LLP

(57) ABSTRACT

In various examples, a deep neural network (DNN) may be used to detect and classify animate objects and/or parts of an environment. The DNN may be trained using camera-to-LiDAR cross injection to generate reliable ground truth data for LiDAR range images. For example, annotations generated in the image domain may be propagated to the LiDAR domain to increase the accuracy of the ground truth data in the LiDAR domain—e.g., without requiring manual annotation in the LiDAR domain. Once trained, the DNN may output instance segmentation masks, class segmentation masks, and/or bounding shape proposals corresponding to two-dimensional (2D) LiDAR range images, and the outputs may be fused together to project the outputs into three-dimensional (3D) LiDAR point clouds. This 2D and/or 3D information output by the DNN may be provided to an autonomous vehicle drive stack to enable safe planning and control of the autonomous vehicle.

20 Claims, 17 Drawing Sheets

Related U.S. Application Data

(60) Provisional application No. 62/893,814, filed on Aug. 30, 2019.

(51) Int. Cl.

| | |
|---|---|
| ***G01S 7/481*** | (2006.01) |
| ***G01S 17/894*** | (2020.01) |
| ***G01S 17/931*** | (2020.01) |
| ***G06V 10/764*** | (2022.01) |
| ***G06V 10/80*** | (2022.01) |
| ***G06V 10/82*** | (2022.01) |
| ***G06V 20/58*** | (2022.01) |
| *G01S 7/28* | (2006.01) |

(52) U.S. Cl.

CPC .......... *G01S 17/931* (2020.01); *G06V 10/764* (2022.01); *G06V 10/80* (2022.01); *G06V 10/82* (2022.01); *G06V 20/58* (2022.01); *G01S 7/28* (2013.01)

(58) Field of Classification Search

CPC ........... G01S 2013/9316; G01S 13/862; G01S 13/865; G01S 13/867; G01S 13/931; G01S 17/86; G06V 10/764; G06V 10/80; G06V 10/82; G06V 20/58; G06F 18/25

See application file for complete search history.

(56) References Cited

U.S. PATENT DOCUMENTS

| | | | | |
|---|---|---|---|---|
| 11,906,660 | B2 | 2/2024 | Wekel et al. | |
| 2018/0161986 | A1 | 6/2018 | Kee et al. | |
| 2018/0348346 | A1* | 12/2018 | Vallespi-Gonzalez | G01S 7/4802 |
| 2019/0057507 | A1* | 2/2019 | El-Khamy | G06N 3/09 |

OTHER PUBLICATIONS

Vaquero et al, Deconvolutional Networks for Point-Cloud Vehicle Detection and Tracking in Driving Scenarios, European Conference on Mobile Robots (ECMR) (Year: 2017).*

IEC 61508, "Functional Safety of Electrical/Electronic/Programmable Electronic Safety-related Systems," https://en.wikipedia.org/wiki/IEC_61508, accessed on Apr. 1, 2022, 7 pgs.

ISO 26262, "Road vehicle—Functional safety," International standard for functional safety of electronic system, https://en.wikipedia.org/wiki/ISO_26262, accessed on Sep. 13, 2021, 8 pgs.

"Taxonomy and Definitions for Terms Related to Driving Automation Systems for On-Road Motor Vehicles", Society of Automotive Engineers (SAE), Standard No. J3016-201609, pp. 30 (Sep. 30, 2016).

"Taxonomy and Definitions for Terms Related to Driving Automation Systems for On-Road Motor Vehicles", Society of Automotive Engineers (SAE), Standard No. J3016-201806, pp. 35 (Jun. 15, 2018).

Wekel, Tilman; Requirement for Restriction/Election for U.S. Appl. No. 17/005,788, filed Aug. 28, 2020, mailed Mar. 21, 2023, 6 pgs.

Wekel, et al.; Non-Final Office Action for U.S. Appl. No. 17/005,788, filed Aug. 28, 2020, mailed Jun. 29, 2023, 28 pgs.

Wikipedia, Image Segmentation, 2023; 22 pgs.

Wekel, Tilman; Final Office Action for U.S. Appl. No. 17/005,788, filed Aug. 28, 2020, mailed Sep. 20, 2023, 16 pgs.

Wekel, Tilman; Notice of Allowance for U.S. Appl. No. 17/005,788, filed Aug. 28, 2020; mailed Nov. 7, 2023, 13 pgs.

Wekel, Tilman; Invitation to pay additional fees for PCT Application No. PCT/US2020/048466, filed Aug. 28, 2020, mailed Nov. 27, 2020, 11 pgs.

Wekel, Tilman; Preliminary Report on Patentability for PCT Application No. PCT/US2020/048466, filed Aug. 28, 2020, mailed Mar. 10, 2022, 12 pgs.

Radi, et al.; "VolMap: A Real-time Model for Semantic Segmentation of a LiDAR 360 surrounding view", Proceedings of the 36th International Conference on Machine Learning, Long Beach CA, PMLR 97, arXiv: 1906.11873v1 [cs.CV], Jun. 12, 2019, 7 pgs.

Wekel, Tilman; International Search Report and Written Opinion for PCT Application No. PCT/US2020/049466, Filed Aug. 28, 2020, mailed Feb. 1, 2021, 16 pgs.

Luo, et al.; (2018). Fast and furious: Real time end-to-end 3d detection, tracking and motion forecasting with a single convolutional net. In Proceedings of the IEEE conference on Computer Vision and Pattern Recognition (pp. 3569-3577).

Qi, et al.; (2017). Pointnet: Deep learning on point sets for 3d classification and segmentation. In Proceedings of the IEEE conference on computer vision and pattern recognition (pp. 652-660).

Kendall, et al. (2017). What uncertainties do we need in bayesian deep learning for computer vision?. In Advances in neural information processing systems (pp. 5574-5584).

Furukawa, H. (2018). Deep learning for end-to-end automatic target recognition from synthetic aperture radar imagery. arXiv preprint arXiv:1801.08558.

Kendall, et al. (2018). Multi-task learning using uncertainty to weigh losses for scene geometry and semantics. In Proceedings of the IEEE conference on computer vision and pattern recognition (pp. 7482-7491).

Ronneberger, et al. (Oct. 2015). U-net: Convolutional networks for biomedical image segmentation. In International Conference on Medical image computing and computer-assisted intervention (pp. 234-241). Springer, Cham.

Szegedy, et al. (2015). Going deeper with convolutions. In Proceedings of the IEEE conference on computer vision and pattern recognition (pp. 1-9).

He, et al.; (2016). Deep residual learning for image recognition. In Proceedings of the IEEE conference on computer vision and pattern recognition (pp. 770-778).

Krizhevsky, et al.; (2012). Imagenet classification with deep convolutional neural networks. In Advances in neural information processing systems (pp. 1097-1105).

* cited by examiner

OBJECT DETECTION AND CLASSIFICATION

CROSS-REFERENCE TO RELATED APPLICATIONS

This application is a continuation of U.S. patent application Ser. No. 17/005,788, filed Aug. 28, 2020, which claims the benefit of U.S. Provisional Application No. 62/893,814, filed on Aug. 30, 2019, each of which is hereby incorporated by reference in its entirety.

BACKGROUND

Designing a system to safely drive a vehicle autonomously without supervision is tremendously difficult. An autonomous vehicle should at least be capable of performing as a functional equivalent of an attentive driver—who draws upon a perception and action system that has an incredible ability to identify and react to moving and static obstacles in a complex environment—to avoid colliding with other objects or structures along the path of the vehicle. Thus, the ability to detect instances of animate objects (e.g., cars, pedestrians, etc.) and other parts of an environment is often critical for autonomous driving perception systems. Some conventional perception methods have relied on cameras or LiDAR sensors to detect objects in an environment, and a variety of approaches have been developed using computer vision processing techniques. However, traditional LiDAR processing methods, such as those that perform low level point cloud processing, often suffer from limited precision and recall, and have limited robustness. For example, traditional methods may be capable of roughly classifying points of a point cloud based on geometric and dynamic features of objects in the environment as represented by a point cloud. However, due to the complexity of this data, computer vision techniques are not capable of robustly assigning a semantic class to points of the point cloud and/or detecting unique object instances.

Other known perception methods have relied on Deep Neural Networks (DNNs) to perform LiDAR-based perception for detecting objects in an environment. However, these DNNs are trained on ground truth data that include images generated in the LiDAR domain. Similarly, some known DNNs are trained on ground truth data directly labeled over LiDAR range images. However, LiDAR images and point clouds are visually difficult to interpret and distinguish from each other and, as a result, the ground truth data generated may be less accurate—thereby leading to DNNs that compute potentially inaccurate and thus less reliable outputs. For example, because locations, orientations, geometry, and/or other information about vehicles, pedestrians, bicyclists, and/or other animate objects may be difficult to accurately label directly within a LiDAR point cloud and/or range image, DNNs trained on ground truth data generated in this way are less likely to compute outputs that enable a vehicle to be controlled at a required level of safety for autonomous driving.

SUMMARY

Embodiments of the present disclosure relate to object detection and classification using range images (images of a scene that convey distance information of objects in the scene from the perspective of the viewer by using pixel values corresponding to the distance to the objects from the viewer). In particular, embodiments of the present disclosure relate to object detection and classification of range images generated using LiDAR data ("LiDAR range images"). for autonomous machine applications. Systems and methods are disclosed that propagate ground truth data generated in an image domain to the LiDAR domain—e.g., to a LiDAR point cloud and/or to a LiDAR range image—without requiring manual annotation of LiDAR data. The propagated ground truth may then be used to train a deep neural network (DNN) of the present disclosure to compute object instance and semantic information for animate actors using two-dimensional (2D) LiDAR range images as input. The outputs of the DNN(s) may be projected back to a LiDAR point cloud to generate a three-dimensional (3D) understanding of a world-space environment of an ego-actor.

The present disclosure describes an approach for performing accurate and reliable LiDAR range image deep neural network (DNN) based processing in the form of a combined point cloud segmentation and bounding box regression network ("PCSNet"). As a result, and in contrast to known approaches such as those described above, the systems and methods described herein provide the ability to robustly assign a semantic class to each point in a LiDAR point cloud as well as to detect unique object instances. Moreover, by not relying on the manual annotation of LiDAR data—a challenging and costly task—the training of the DNN(s) may be more efficient due to the accuracy of the propagated ground truth from a more easily understandable image domain to a less comprehendible LiDAR domain. In addition, in some embodiments, a size of a training data set may be artificially increased by creating a series of virtual LiDAR sensors with varying virtual sensory fields. As a result, the time and resources of generating a large enough training set for accurately training the DNN(s) may be reduced by repurposing existing ground truth data using virtual LiDAR sensors. As such, the techniques described herein may be used to detect and classify animate objects and/or parts of an environment using LiDAR range images, and these detections and classifications—e.g., after post-processing—may be provided to an autonomous vehicle drive stack to enable safe planning and control of the autonomous vehicle.

BRIEF DESCRIPTION OF THE DRAWINGS

The present systems and methods for object detection and classification using LiDAR range images for autonomous machine applications are described in detail below with reference to the attached drawing figures, wherein.

DETAILED DESCRIPTION

Figure 1:
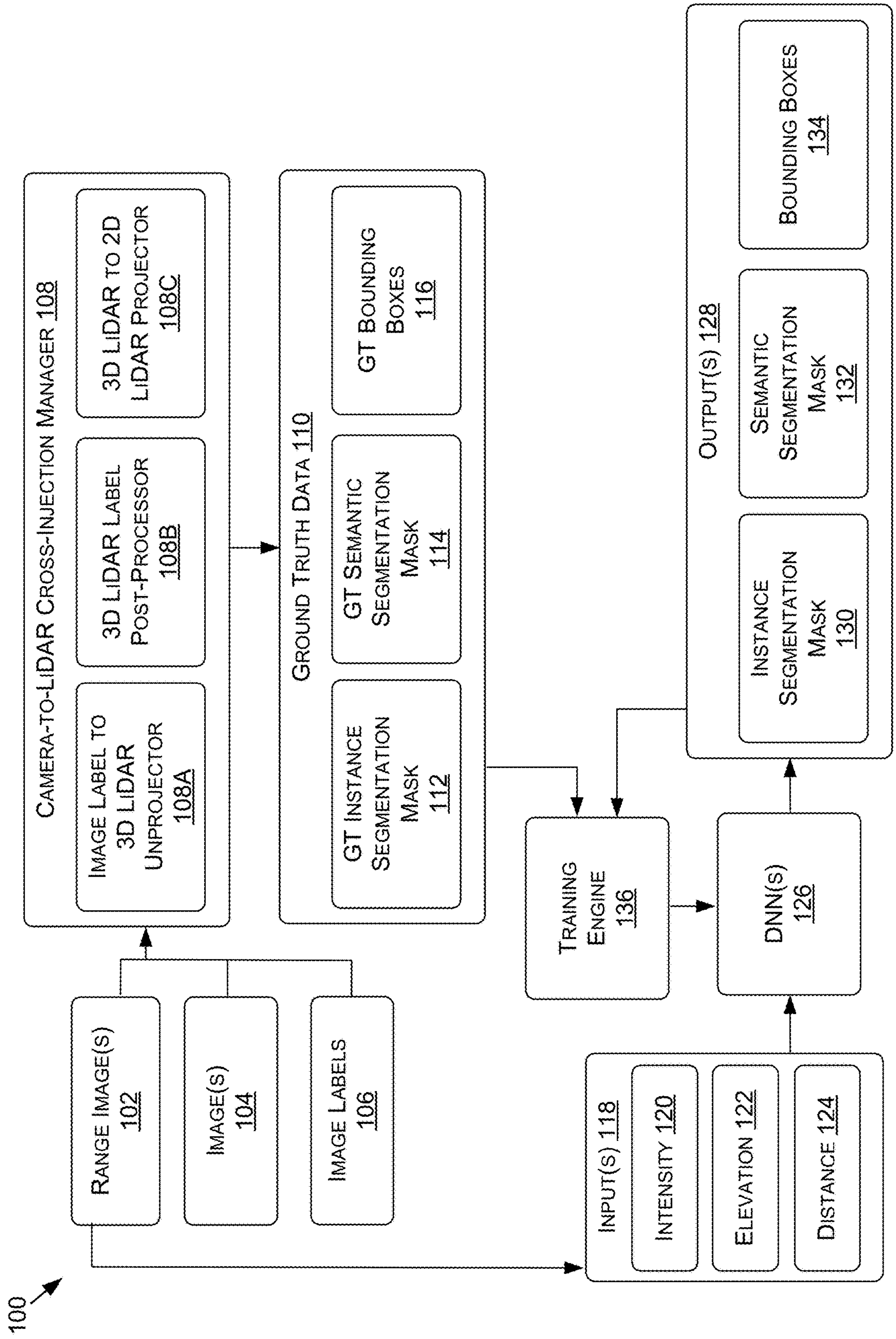
FIG. 1 is an example data flow diagram for a process of training a deep neural network (DNN) using camera-to-LiDAR cross-injection, in accordance with some embodiments of the present disclosure.

Systems and methods are disclosed related to object detection and classification using LiDAR range images for autonomous machine applications. For example, systems and methods described herein use object detection techniques to identify or detect instances of obstacles (e.g., cars, trucks, pedestrians, cyclists, etc.) and other objects such as environmental parts for use by autonomous vehicles, semi-autonomous vehicles, robots, and/or other object types.

Although the present disclosure may be described with respect to an example autonomous vehicle 800 (alternatively referred to herein as "vehicle 800" or "ego-vehicle 800," an example of which is described herein with respect to FIGS. 8A-8D), this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to autonomous driving, this is not intended to be limiting. For example, the systems and methods described herein may be used in robotics (e.g., path planning for a robot), aerial systems (e.g., path planning for a drone or other aerial vehicle), boating systems (e.g., path planning for a boat or other water vessel), and/or other technology areas, such as for localization, path planning, and/or other processes. In addition, although the present disclosure is primarily described with respect to LiDAR sensors, this is not intended to be limiting. For example, data from RADAR sensors, ultrasonic sensors, cameras, and/or other sensor types may be used without departing from the scope of the present disclosure (e.g., labels from the image domain may be unprojected to the RADAR domain, to the ultrasonic domain, etc., using method described herein).

At a high level, one or more deep neural networks (DNNs) may be used to detect objects from LiDAR data and/or other sensor data that captures a three dimensional (3D) environment. For example, LiDAR range image DNN-based processing may be executed in the form of a combined point cloud segmentation and bounding box regression network (PCSNet). A set of auto-labeling algorithms may be used to propagate ground truth labels from a camera image domain to a LiDAR range image domain—e.g., by way of a LiDAR point cloud—to generate accurate ground truth data in the LiDAR range image domain for training the DNN(s).

During inference, in some embodiments, the input to the DNN(s) may be formed from LiDAR data (e.g., a LiDAR range image, a projection of a LiDAR point cloud, etc.). For example, the LiDAR data input to the DNN(s) may correspond to a LiDAR range image with distance, elevation, and/or intensity output channels that may be used to generate a multi-channel input tensor for the DNN(s). In some embodiments, to form the input into the DNN, raw LiDAR detections from an environment around an ego-object—such as a moving vehicle—may be pre-processed into a format that the DNN understands. In particular, LiDAR data (e.g., raw LiDAR detections from an ordered or unordered LiDAR point cloud) may be accumulated, transformed to a single coordinate system (e.g., centered around the ego-actor), ego-motion-compensated (e.g., to a latest known position of the ego-actor), and/or projected to form a LiDAR range image.

The DNN(s) may process the LiDAR data to compute outputs corresponding to instance segmentation masks, per-class semantic segmentations masks, and/or bounding shapes (e.g., two-dimensional (2D) range image bounding boxes). These outputs may be processed into 2D bounding boxes (e.g., corresponding to the LiDAR range image) and/or three-dimensional (3D) bounding boxes (e.g., corresponding to a LiDAR point cloud used to generate the LiDAR range image) and class labels for the detected objects. For example, the outputs of the DNN(s) may be post-processed, such as to fuse the outputs together and co-process the fused outputs with LiDAR range image inputs (e.g., elevation, distance, intensity, etc.) to determine 3D distance to object estimates and/or labeled 3D detections. The labeled 3D detections may then be used in an end-to-end LiDAR data processing pipeline for various operations of an autonomous vehicle, such as LiDAR based perception and tracking. As such, in a non-limiting example, the DNN(s) may be used to predict one or more bounding boxes for each detected object on the road or sidewalk, a class label for each detected object, and a mask demarcating a drivable free-space (e.g., a road surface defined as a physically drivable space).

During training, in embodiments, LiDAR range image data and labeled (e.g., annotated) image data may be used to perform camera-to-LiDAR cross-injection for generating ground truth data. For example, images represented by the image data may be annotated or otherwise labeled with instance segmentation masks, per-class semantic segmentation masks, and/or bounding shapes, and this image domain ground truth data, in addition to the image data and the LiDAR range image data, may be used to generate corresponding ground truth labels for the LiDAR range image. In some embodiments, the cross-injection process may include unprojecting the labels in the image domain to 3D LiDAR data space (e.g., to a LiDAR point cloud). This may be performed using intrinsic and/or extrinsic parameters of the image sensor that generated the image data and/or the LiDAR sensor that generated the LiDAR data. For example, a mapping of pixels in image-space to corresponding points in the LiDAR point cloud (or in the world-space that the LIDAR point cloud corresponds to) may be known, and this relationship may be used to unproject the labels in the image domain to the 3D LiDAR data space.

Once in the 3D LiDAR data space, the resulting 3D LiDAR ground truth data proposals may be post-processed, in embodiments, using one or more geometric constraints. For example, geometric constraints may be imposed on the resulting 3D LiDAR ground truth data labels to filter out points that have improper or inaccurate associated labels. For example, due to differences in sensory fields of the camera and LiDAR sensor, improper alignment of the camera and the LiDAR sensor, and/or other error sources, some points may have inaccurate labels. As a result, and with an understanding that each point corresponding to a same object instance should conform to certain geometric constraints (e.g., all of the points for a pedestrian should be within two, three, five, etc. meters of one another, all points for a vehicle should be within four, five, ten, etc. meters of one another, etc.), points that fall outside of the imposed constraints may be filtered out and/or may have their associated labels updated. In some non-limiting embodiments, a random sample consensus (RANSAC) algorithm may be applied to the labels in 3D LiDAR data space to filter points out and to increase the accuracy of the resulting ground truth labels. In other embodiments, a maximum likelihood estimate sample consensus (MLESAC) algorithm, a maximum a posterior sample consensus (MAPSAC), a Hough transform algorithm, and/or another geometric constraint algorithm may be applied.

The 3D LiDAR ground truth data—e.g., after post-processing—may be projected to a 2D LiDAR range image domain. As such, a ground truth encoder may use the projected 2D LiDAR range image to compute instance segmentation masks, per-class semantic segmentation masks, and/or 2D range image bounding shapes corresponding to the 2D LiDAR range image. This encoded ground truth data may be used to train the DNN(s) (e.g., the PCSNet) to predict, based on intensity, elevation, and/or distance input channels obtained from the LiDAR range image data, instance segmentation masks, per-class segmentation masks, and/or 2D bounding shapes. The predictions may be compared against the encoded ground truth information using one or more loss functions applied by a DNN training engine, and the DNN parameters (e.g., weights and biases) may be updated accordingly until the DNN(s) converges to an acceptable level of accuracy.

Training a DNN for Object Detection and Classification

With reference to FIG. 1, FIG. 1 is an example data flow diagram for a process 100 of training a DNN using camera-to-LiDAR cross-injection, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may be used to train a DNN(s) 126 to compute outputs 128 using data from range images 102 as inputs 118—e.g., intensity 120, elevation 122, and/or distance 124. In order to generate ground truth data 110 that is accurate and reliable, as described herein, a camera-to-LiDAR cross-injection manager 108 (alternatively referred to herein as “cross-injection manager 108”) may be used to transfer—or cross-inject—image labels 106 corresponding to images 104 into the LiDAR domain. Cross-injection may be used due to the difficulty or accurately labeling ground truth data in the LiDAR domain—e.g., in a range image 102, a LiDAR point cloud, and/or another 2D or 3D LiDAR data representation. For example, when a human annotator and/or an annotation tool analyzes a LiDAR data representation, the location of animate actors (e.g., cars, trucks, pedestrians, cyclists, etc.), ground surfaces, drivable free-space, and/or environmental features (e.g., trees, buildings, signs, poles, etc.) may not be readily apparent. To the contrary, images 104—e.g., generated from one or more image sensors of one or more cameras—resemble what a human annotator and/or an annotation tool is trained or conditioned to see. As such, the image labels 106 generated to correspond to the images 104 may be more accurately defined as an animate actor, a ground surface, a drivable free-space boundary, and/or environmental features may be quickly identifiable within an image 104. Once the image labels 106 are generated, these labels may undergo cross-injection via the cross-injection manager 108 to propagate the image labels 106 to the LiDAR domain for generating the ground truth data 110 corresponding to the range images 102.

The image labels 106 may be generated within a drawing program (e.g., an annotation program), a computer aided design (CAD) program, a labeling program, another type of program suitable for generating the image labels 106 and/or may be hand drawn, in some examples. In any example, the image labels 106 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies center or origin point and dimensions of areas, machine generates polygons and/or labels for intersection areas).

The range images 102 may be represented by data corresponding to an elevation 122, an intensity 120, and/or a distance 124 for each pixel of the range image 102. For example, the elevation 122 may correspond to one axis or channel of the range images 102, and may represent the height of the point from a reference point or plane. The other axis or channel of the range image 102 may correspond to an unwrapped field of view or sensory field angle of the LiDAR sensor. For example, the LiDAR sensor may have a field of view of 180 degrees, 270 degrees, 360 degrees (e.g., a spinning LiDAR sensor), and/or another angle. As such, the LiDAR range image 102 pixel value may correspond to the 3D location of the LiDAR point, and this value may be used to compute the distance 124 via a latency analysis. In some embodiments, the intensity 120 may correspond to another channel of the range image 102 (e.g. another value encoded to each pixel associated with an intensity of a LiDAR point), which may be used to compute or infer texture of the incident object. As a result, using the intensity 120, the elevation 122, and/or the distance 124, the LiDAR range images 102 may be interpreted by the DNN(s) 126 as a standard camera image. In some embodiments, the range image 102 may represent the entire field of view of the LiDAR sensor such that, when unwrapped, the range image 102 may be interpreted as a standard 2D camera image. The range image 102 may represent the LiDAR point cloud projected onto a plane of the range image 102 from a perspective view.

In some embodiments, the image labels 106 may correspond to instance segmentation masks, semantic segmentation masks, and/or bounding shapes. For example, with reference to FIG. 2A, image labels 106 (e.g., annotations) corresponding to an image 104A may include bounding shapes 202A and 202B corresponding to car 204 and pedestrian 206, respectively. The bounding shapes 202, once annotated, may be encoded as ground truth in any number of ways. For example, a pixel location of a centroid of the bounding shapes, dimensions (e.g., height, width, etc.) of the bounding shapes 202, and/or orientation information with respect to the bounding shapes 202 may be encoded as the ground truth corresponding to the image 104A. In other embodiments, a pixel location of one or more vertices of the bounding shapes 202 may be encoded in addition to, or alternatively from the centroid. After cross-injection, the locations of the bounding shapes 202 in the LiDAR domain may be useful for, among other things, identifying which points in the LiDAR range image 102 and/or corresponding LiDAR point cloud correspond to each object or animate actor.

To generate instance segmentation masks, the image labels 106 may include bounding contours 208A (e.g., corresponding to the car 204), 208B (e.g., corresponding to the pedestrian 206), and 208C (e.g., corresponding to a drivable-free space boundary). In some embodiments, the boundary contours 208 may be used to encode instance segmentation information. For example, each of the pixels within a given boundary contour 208 may be encoded with unique instance information. This unique instance information may include an instance value for each separate object or actor. For example, each pixel along and/or within the boundary contour 208A of the car 204 may have a unique instance value encoded thereto, each pixel along and/or within the boundary contour 208B of the pedestrian 206 may have a unique instance value encoded thereto, and so on. After cross-injection, the instance segmentation mask information may be useful in the LiDAR domain for, among other things, identifying which points in the LiDAR range image 102 and/or corresponding LiDAR point cloud correspond to each unique actor instance. Identifying unique actor instances may aid in tracking unique actor instances across frames, to understand movements and patterns of unique actor instances, and to use this information for path planning, obstacle or collision avoidance, and/or other operations of the vehicle 800.

Figure 2A:
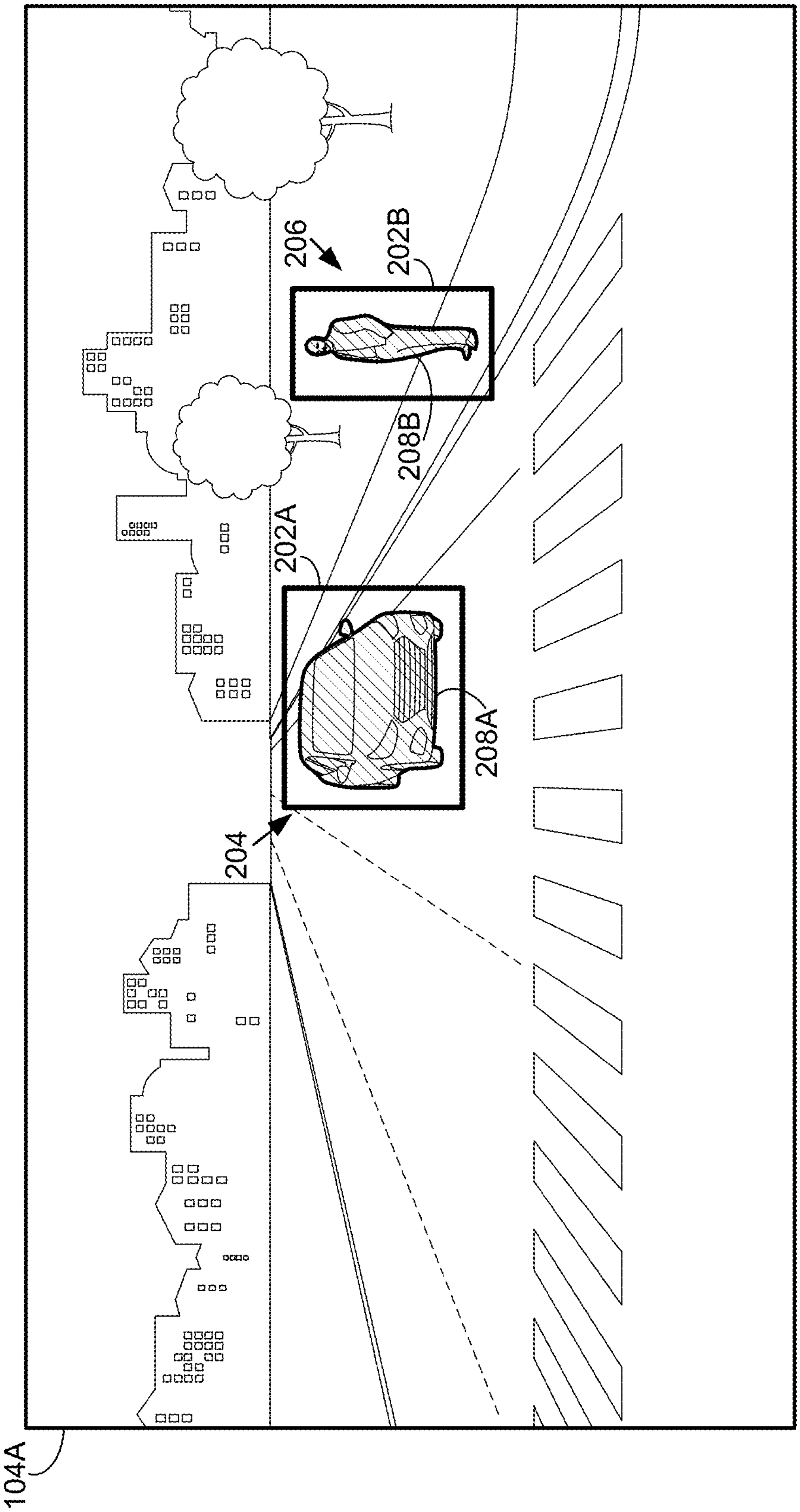
FIGS. 2A-2B depict example image domain ground truth annotations of images, in accordance with some embodiments of the present disclosure.
Figure 2B:
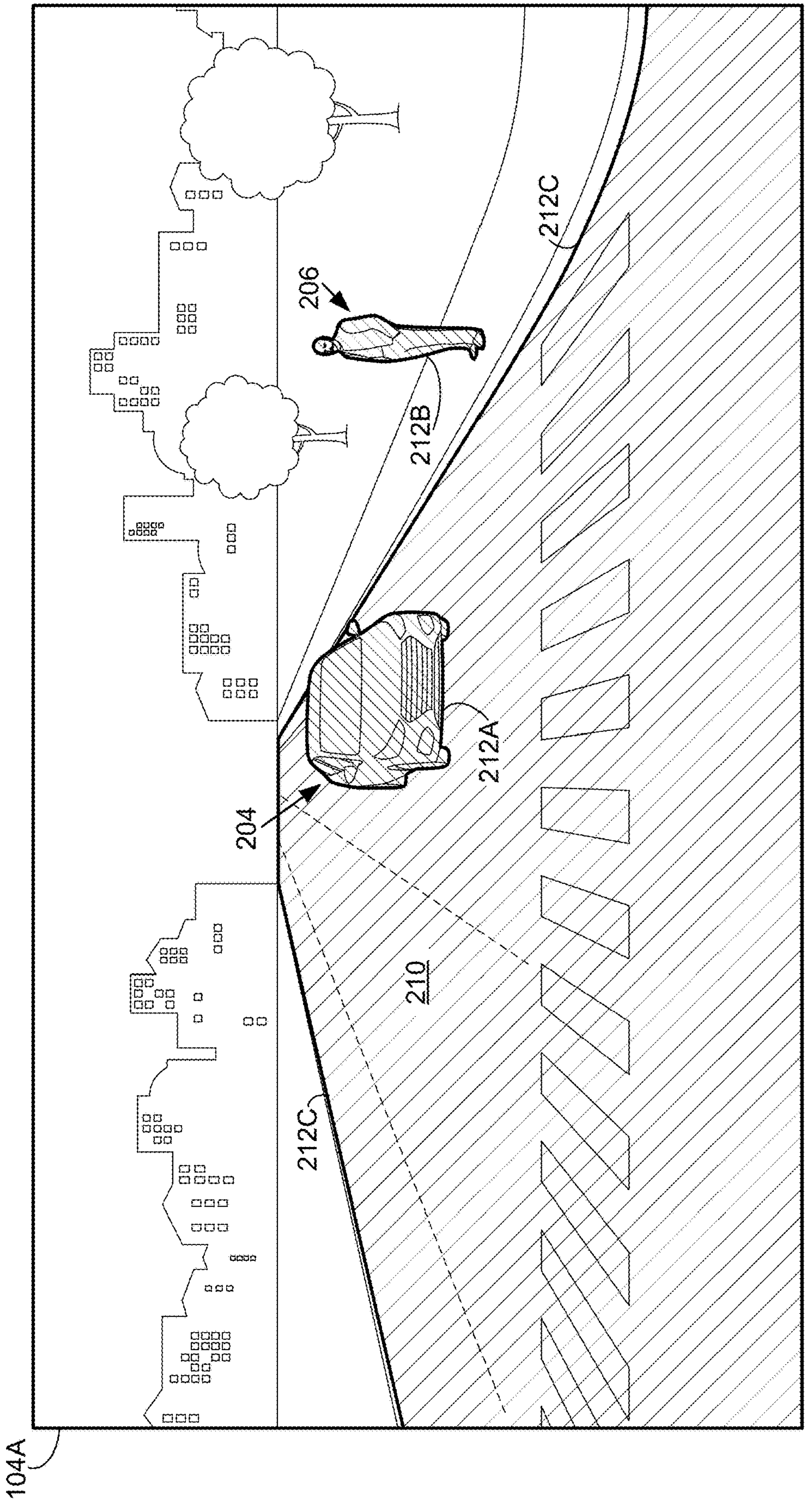

With reference to FIG. 2B, to generate class segmentation masks, the image labels 106 may include bounding contours 212A (e.g., corresponding to the car 204), 212B (e.g., corresponding to the pedestrian 206), and 212C (e.g., corresponding to a drivable-free space boundary). In addition to the bounding contours 212, semantic classes may be assigned to the bounding contours 212 such that the boundary contours 212 may be used to encode class segmentation information. For example, a different annotation tool, color, etc. may be used for each different class. As such, in a non-limiting example, each car 204 may be labeled with a first classification, each pedestrian 206 may be labeled with a second classification, each cyclist may be labeled with a third classification, a drivable free-space 210 may be labeled with a third classification, and so on. To encode the class segmentation information, each pixel along and/or within the boundary contours 212 may be encoded with a value(s) corresponding to the associated classification. For example, confidence values may be used to represent classes for pixels and, as a result, each pixel within a boundary contour 212 may be encoded to have a value of 1.0 for the associated class, and a value of 0.0 for each other class the DNN(s) 126 is trained to detect. After cross-injection, the class segmentation mask information may be useful in the LiDAR domain for, among other things, identifying which points in the LiDAR range image 102 and/or corresponding LiDAR point cloud correspond to certain classifications. In some embodiments, such as where an instance segmentation mask is not a separate output channel of the DNN(s) 126, the class segmentation mask and/or the bounding shapes may be used (e.g., individually, in combination, etc.) to determine unique actor instances. For example, a cluster of pixels that each correspond to a same class and that are within a bounding shape may be computed or determined to be a unique actor instance.

Although the bounding shapes 202 are illustrated as being annotated in addition to the boundary contours 208 corresponding to instance segmentation in FIG. 2A, this is not intended to be limiting. For example, in other embodiments, the bounding shapes 202 may be annotated along with the boundary contours 212. As such, any image label 106 type may be separately labeled from other types, or any combination of the image label 106 types may be annotated together for a single instance of an image 104.

The cross-injection manager 108 may use the LiDAR range images 102, the images 104, and/or the image labels 106 as input. In some embodiments, the image labels 106 alone may be cross-injected to the LiDAR domain (e.g., information about the locations of the bounding shapes 202, the locations of the boundary contours 208 and/or 212, etc.). As such, the image labels 106 may not be used to generate ground truth corresponding to the images 104. For example, the correlation between pixels corresponding to the image labels 106 with points in the LiDAR point cloud may be known, and the image labels 106 may thus be transferred or propagated to the LiDAR point cloud.

In other embodiments, however, the information cross-injected to the LiDAR domain may include the encoded information based on the image labels 106. For example, where certain pixels are encoded with class confidence values, the corresponding LiDAR point cloud points may be encoded with similar class confidence values, and then that information may be encoded in the GT class segmentation mask 112 corresponding to the range images 102. As such, the encoded ground truth data may be cross-injected from the camera domain to the LiDAR point cloud domain, and then to the LiDAR range image domain. In some embodiments, both the image labels 106 and the information encoded therefrom in the image domain may be transferred to the LiDAR domain.

In order to accurately generate the ground truth data 110 using the cross-injection manager 108, the LiDAR data (corresponding to a LiDAR point cloud and the range images 102) and the image data (corresponding to the images 104) may be registered to one another both temporally (e.g., captured as substantially the same time) and spatially (e.g., have at least partially overlapping sensory fields or fields of view). Since the post-processing techniques described herein are able to deal with small registration errors between the image sensors and the LiDAR sensors, the temporal and spatial registration provides an accurate mapping between the 2D image coordinate space and the 3D LiDAR coordinate space. In some embodiments, intrinsic parameters and/or extrinsic parameters of the image sensors and the LiDAR sensors may be used to determine spatial transformation information between the image domain and the LiDAR domain. The spatial transformation information may then be used to propagate or unproject the image labels 106 from the image domain to the LiDAR domain—e.g., from the images 104 to a LiDAR point cloud using image label to 3D LiDAR unprojector 108A.

Figure 2C:
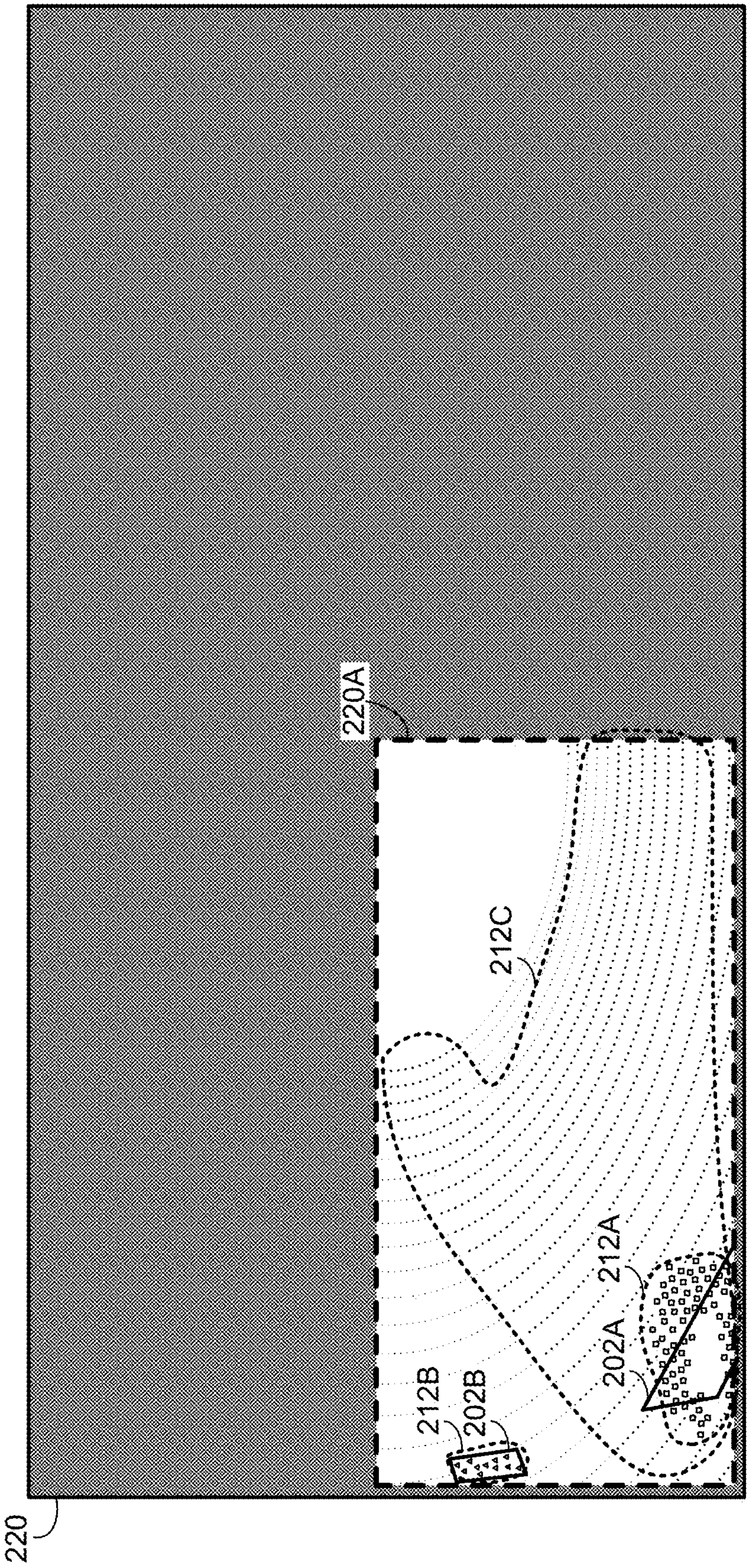
FIG. 2C depicts example LiDAR domain ground truth annotations in a LiDAR point cloud corresponding to the image domain ground truth annotations of FIGS. 2A-2B, in accordance with some embodiments of the present disclosure.

For example, and with respect to FIGS. 2A, 2B and 2C, the image label to 3D LiDAR unprojector 108A may be used to transfer the bounding shapes 202A and 202B from the image 104A to LiDAR point cloud 220 (or LiDAR point cloud portion 220A, thereof, corresponding to the portion of the field of view of the image sensor that corresponds to a larger field of view of the LiDAR sensor). Similarly, the boundary contours 208A and 208B may be directly transferred to the LiDAR point cloud 220 and/or used to determine the points in the LiDAR point cloud 220 that correspond to the boundary contours 208A and 208B in the LiDAR domain. For example and with reference to FIG. 2C, boundary contour 208A/212A may be used to identify the points (depicted as squares for illustrative purposes only) within the boundary contour 208A/212A, boundary contour 208B/212B may be used to identify the points (depicted as triangles for illustrative purposes only) within the boundary contour 208B/212B, and boundary contour 212C may be used to identify the points within the boundary contour 208B (depicted as bold dots for illustrative purposes only). Once transferred or unprojected, the labels in the LiDAR point cloud may maintain their associated classification information, instance information, etc., but the location information may be updated to reflect their relative location in the LiDAR domain.

The labels in the LiDAR point cloud (and/or the points in the LiDAR point cloud determined based on the image labels 106 and/or the unprojected image labels) may undergo post-processing using the 3D LiDAR label post-processor 108B. For example, one or more geometric constraints may be imposed on the labels and/or the points within the LiDAR point cloud determined therefrom. In some embodiments, the geometric constraints may be applied using a RANSAC algorithm; however, this is not intended to be limiting, and in other embodiments, a MLESAC algorithm, a MAPSAC algorithm, a Hough transform algorithm, and/or another geometric constraint algorithm may be applied to enforce the geometric constraints. The geometric constraints may be enforced in order to filter out or remove outlier points in the LiDAR point cloud that are not likely to correspond to the same class and/or instance. For example, with respect to FIG. 2C, there may be points within the boundary contour 212A that have corresponding distance values that are different enough from other points and/or that would correspond to the car 204 being larger than some predetermined threshold size attributed to cars (e.g., no greater than five meters, ten meters, etc. in height, width, and/or length). As another example, an average of the points within the boundary contour 212B may have a corresponding distance value of ten meters, and another point may have a distance value of fifty meters (e.g., based on a LiDAR beam reflection off of a building behind the pedestrian 206). Although distance-based filtering is described, this is not intended to be limiting, and elevation and/or intensity may additionally or alternatively be used for filtering of points in the LiDAR point cloud corresponding to the transferred image labels 106. As such, the points of the LiDAR point cloud 220 that fall outside of the geometric constraints may be removed in order to generate more accurate ground truth data 110 for training the DNN(s) 126.

The LiDAR labels and/or other ground truth information determined from the LiDAR labels and/or the image labels 106 may be used to generate ground truth data corresponding to the range images 102. For example, the LiDAR point cloud may be projected—from a perspective view, in embodiments—to the range image 102 using the 3D LiDAR to 2D LiDAR projector. The projection of the ground truth data from the LiDAR point cloud to the range image 102 may be from a perspective view of the LiDAR sensor and/or the vehicle 800. As an example, and with respect to FIG. 2D, the ground truth labels and/or corresponding ground truth information (e.g., the encoded values from points of the LiDAR point cloud 220 as projected to the pixels of the range images 102A) may be projected to the range image 102A. As a result, the portion of the LiDAR point cloud 220A and the corresponding ground truth data may be projected to the unwrapped range image 102A. This may result in the ground truth data 110 including a ground truth (GT) instance segmentation mask 112, a GT semantic segmentation mask 114, and/or GT bounding boxes 116 corresponding to the range image 102A. For example, the ground truth labels may be transferred from the LiDAR point cloud 220 to the range image 102A, such as the bounding shapes 202A and 202B and/or the boundary contours 208 and/or 212 corresponding to the instance segmentation mask and the class segmentation mask, respectively. In some embodiments, such as where the LiDAR point cloud points are encoded with the ground truth information based on the transferred image labels 106 and/or the transferred encoded values from the image domain, the projection of the ground truth data from the LiDAR point cloud to the range image 102 may include projecting the encoded values of the LiDAR point cloud points to the corresponding pixels of the range image 102. As such, the ground truth data 110 may include the labels and/or may include the encoded ground truth information generated in the image domain and/or the LiDAR point cloud domain based on the labels.

Figure 2D:
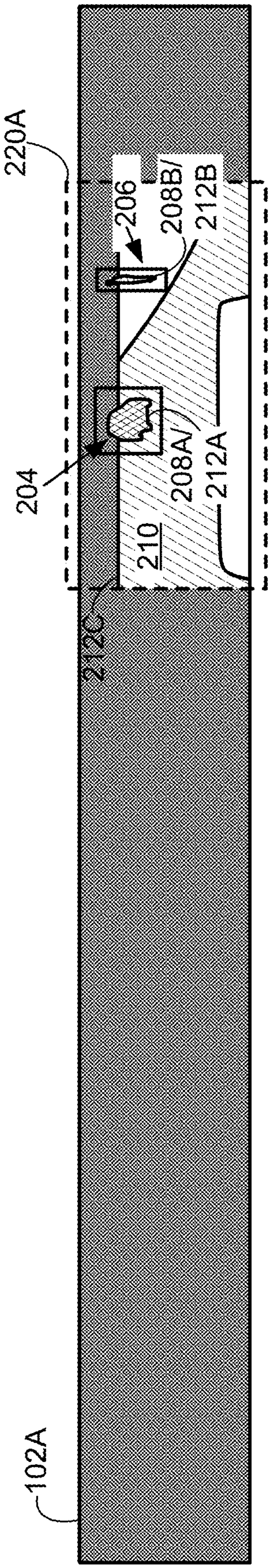
FIG. 2D depicts example LiDAR domain ground truth annotations in a LiDAR range image corresponding to the LiDAR ground truth annotations of FIG. 2C.

As illustrated in FIGS. 2C and 2D, due to camera image field of view limitations, the image labels 106 may only correspond to a portion 220A of the LiDAR point cloud 220 and, as a result, only a portion of the range image 102A. This may be a result of the field of view or sensory field of the camera or image sensor being less than the field of view or sensory field of the LiDAR sensor(s). To overcome this limitation, and to train the DNN(s) 126 to generalize to surround view—or e.g., to the field of view of the deployed LiDAR sensor used to generate the range images 102 in deployment—different sequences of training data that have different camera orientations may be used to stitch together the effect of a single training sequence with a surround (e.g., 360 degree) camera field of view. For example, different image labels 106 generated from different camera perspectives may be used to generate the ground truth data 110 for the DNN(s) 126 to teach the DNN(s) 126 to generalize to surround view. For example, a subset of the training data may be generated using an image sensor having a 180 degree field of view and another image sensor having another 180 degree field of view, such that the combination of the two may generate ground truth data 110 for an entire 360 degree field of view of the range images 102. As a result, and due to translational invariance, the deployed DNN(s) 126 (as described with respect to FIG. 4) may be rescaled to the full field of view of the LiDAR sensor used to generate the range images 102 in deployment. In this way, the fields of view of the image labels 106 and the field of view of the unwrapped LiDAR range images 102 may be matched, such that the image labels 106 cover or correspond to the full LiDAR range image 102.

In some embodiments, to generate additional ground truth data 110 without requiring additional training data be captured in the real-world, one or more virtual LiDAR sensors or simulated data from one or more virtual LiDAR sensors may be generated and injected into the LiDAR point clouds generated from the LiDAR data of the LiDAR sensors. For example, because the LiDAR point cloud may have already been generated, and ground truth data may already be unprojected from the image domain to the LiDAR domain, the virtual LiDAR sensors may be used to generate additional range images by projecting the LiDAR point cloud and the corresponding ground truth to range images from a perspective of the virtual LiDAR sensor. As a result, the existing LiDAR data and ground truth data is reused from any number of different perspectives, poses, orientations, etc. of virtual LiDAR sensors.

For example, a centroid of an object in the LiDAR point cloud as determined using the geometric constraint results (e.g., 1D RANSAC) may be used to connect a line from the centroid of the object to a centroid of the LiDAR sensor, and a plane slice via line that is orthogonal to the connecting line in 3D space may be defined. The tilt of this plane slice may be assumed to be orthogonal to a rig coordinate of the vehicle (e.g., a point centered on a rear axle of the vehicle). Once the mapping is established, the original reference LiDAR sensor may be perturbated to infer new 2D planes in the 3D LiDAR point cloud. As such, the annotated 3D points in the LiDAR point cloud may be projected into additional 2D range images.

In any example, the range images 102 may ultimately be encoded to generate the ground truth data 110 corresponding to the range images 102. For example, pixels of the range image 102 may have instance values encoded thereto to generate the GT instance segmentation mask, class confidence values encoded thereto to generate the GT semantic segmentation mask 114, and/or bounding box location, dimension, orientation, and/or other information encoded thereto to generate the GT bounding boxes 116. This ground truth data 110 may then be used by the training engine 136 to train the DNN(s) 126—e.g., using one or more loss functions—to compute outputs 128 of acceptable accuracy. For example, the DNN(s) 126 may receive the inputs 118 representative of values determined from the range images 102—e.g., intensity 120, elevation 122, and/or distance 124—and may use this input information (e.g., in the form of an input tensor corresponding to the range image 102) to compute the outputs 128. The outputs 128 may include a computed instance segmentation mask 130 (e.g., per-pixel instance values), a compute semantic segmentation mask 132 (e.g., per-pixel semantic or class confidence values), and/or computed bounding boxes 134 (e.g., values corresponding to pixels that include centroid and/or vertex pixel locations of bounding shapes, values corresponding to dimensions of bounding shapes, values corresponding to orientations of bounding shapes, etc.).

The outputs 128 may be compared, by the training engine 136, against the ground truth data 110, and the loss function (s) may be used to update parameters (e.g., weights and biases) of the DNN(s) 126 until the DNN(s) 126 converges to an acceptable level of accuracy.

Although examples are described herein with respect to using DNNs, and specifically convolutional neural networks (CNNs), this is not intended to be limiting. For example, and without limitation, the DNN(s) 126 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of machine learning models.

As an example, such as where the DNN(s) 126 include a CNN, the DNN(s) 126 may include any number of layers. One or more of the layers may include an input layer. The input layer may hold values associated with the range image 102 (e.g., before or after post-processing). For example, the input layer may hold values representative of the pixel values of the range image(s) 102 as a volume (e.g., a width or angle of the field of view of the LiDAR sensor, an elevation, a depth, and/or an intensity channel).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied.

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from a 32×32×12 input volume).

One or more of the layers may include one or more fully connected layer(s). Each neuron in the fully connected layer(s) may be connected to each of the neurons in the previous volume. In some examples, the CNN may include a fully connected layer(s) such that the output of one or more of the layers of the CNN may be provided as input to a fully connected layer(s) of the CNN. In some examples, one or more convolutional streams may be implemented by the DNN(s) 126, and some or all of the convolutional streams may include a respective fully connected layer(s).

In some non-limiting embodiments, the DNN(s) 126 may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the DNN(s) 126, this is not intended to be limiting. For example, additional or alternative layers may be used in the DNN(s) 126, such as normalization layers, SoftMax layers, and/or other layer types.

In embodiments where the DNN(s) 126 includes a CNN, different orders and/or numbers of the layers of the CNN may be used depending on the embodiment. In other words, the order and number of layers of the DNN(s) 126 is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the DNN(s) 126 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

Figure 3:
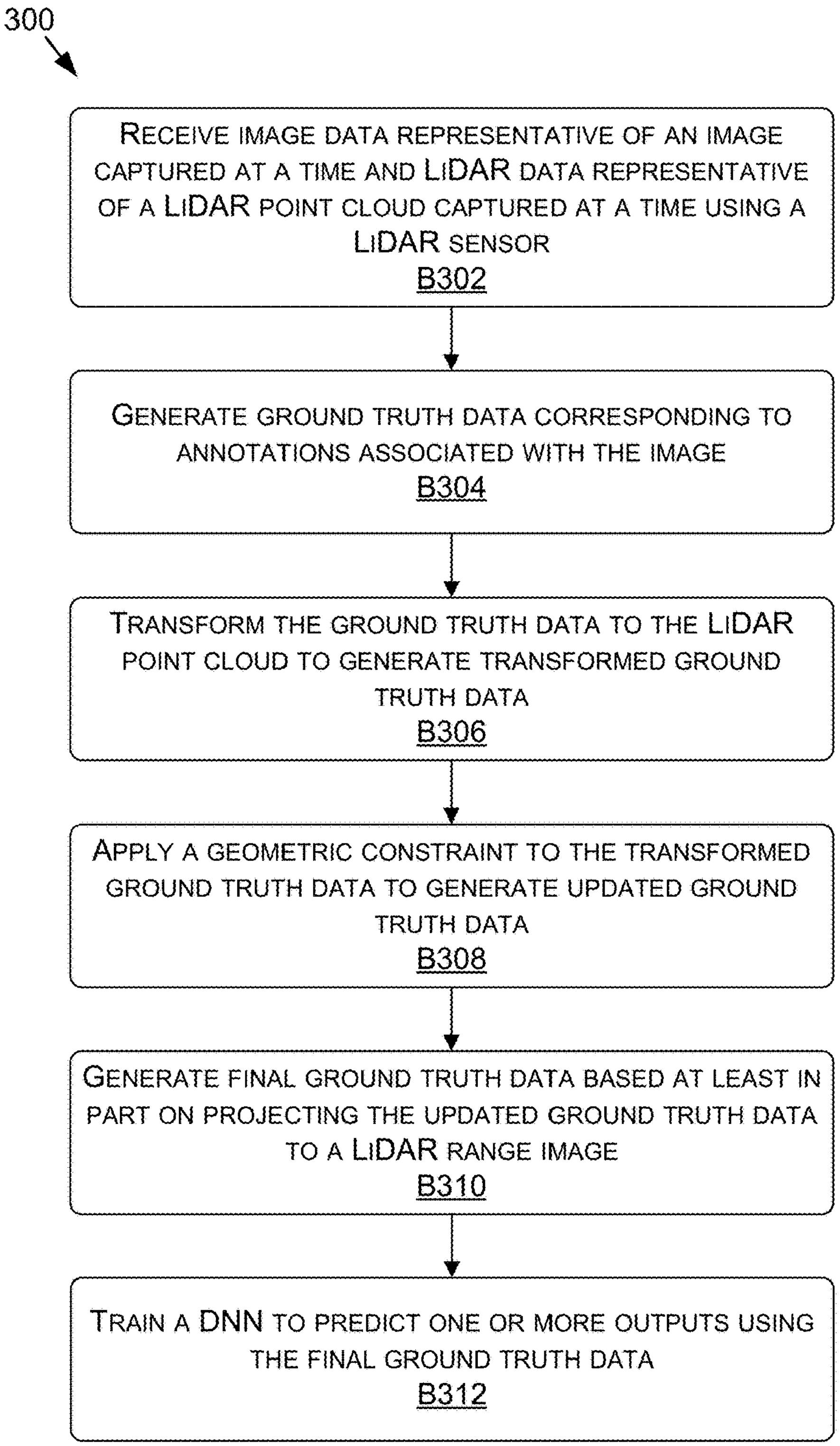
FIG. 3 is a flow diagram showing a method for training a DNN for object detection and classification using a LiDAR range image, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, method 300 is described, by way of example, with respect to process 100 of FIG. 1. However, this method 300 may additionally or alternatively be executed by any one process and within any one system, or any combination of processes and systems, including, but not limited to, those described herein.

FIG. 3 is a flow diagram showing a method 300 for training a DNN to compute object detections and classifications using LiDAR range images, in accordance with some embodiments of the present disclosure. The method 300, at block B302, includes receiving image data representative of an image captured at a time and LiDAR data representative of a LiDAR point cloud captured at a time using a LiDAR sensor. For example, image data representative of the image(s) 104 and LiDAR data may be captured and/or received. In embodiments, the camera that captures the image data may have a field of view that at least partially overlaps with a sensor field of the LiDAR sensor that captures the LiDAR data. In addition, the capturing of the image data and the LiDAR data may be at a same or at substantially the same time. The LiDAR data may be generated in a raw format, as described herein, and used to generate the 3D LiDAR point cloud.

The method 300, at block B304, includes generating ground truth data corresponding to annotations associated with the image. For example, the image labels 106 may be annotated, and ground truth data representative of the image labels 106 may be generated in the image domain.

The method 300, at block B306, includes transforming the ground truth data to the LiDAR point cloud to generate transformed ground truth data. For example, the image labels 106 may be unprojected from the image domain to the LiDAR domain and represented as the transformed ground truth data in the LiDAR point cloud. This may include transferring the image labels 106 themselves (e.g., propagating the image labels 106 to the LiDAR point cloud to generate LiDAR labels or annotations), and/or may include transferring encoded ground truth data determined using the image labels from the image domain to the LiDAR domain (e.g., pixels of the image may be encoded with semantic and/or instance segmentation values based on the image labels 106, such as confidence values, and these encoded values may be transferred from the pixels of the image 104 to corresponding points of the LiDAR point cloud).

The method 300, at block B308, includes applying a geometric constraint to the transformed ground truth data to generate updated ground truth data. For example, the ground truth data (e.g., annotations and/or encoded information determined therefrom) may be used to determine the points of the LiDAR point cloud that belong to each actor, each class, etc., and the clusters of points corresponding to actors or other features of the environment (e.g., drivable space, sidewalks, etc.) may be analyzed using one or more geometric constraints. For example, a RANSAC algorithm may be used to filter out points that are outliers.

The method 300, at block B310, includes generating final ground truth data based at least in part on projecting the updated ground truth data to a LiDAR range image. For example, the encoded ground truth data corresponding to points of the LiDAR point cloud—e.g., corresponding to semantic segmentation masks, instance segmentation masks, bounding shape locations, etc.—may be projected (e.g., from a perspective view) to a LiDAR range image 102 that is generated from the LiDAR point cloud. As a result, the ground truth data 110 may be generated that corresponds to the range images 102.

The method 300, at block B312, includes training a DNN to predict one or more outputs using the final ground truth data. For example, the DNN(s) 126 may be trained using the training engine 136 and the ground truth data 110.

Object Detection and Classification Using a DNN

Figure 4:
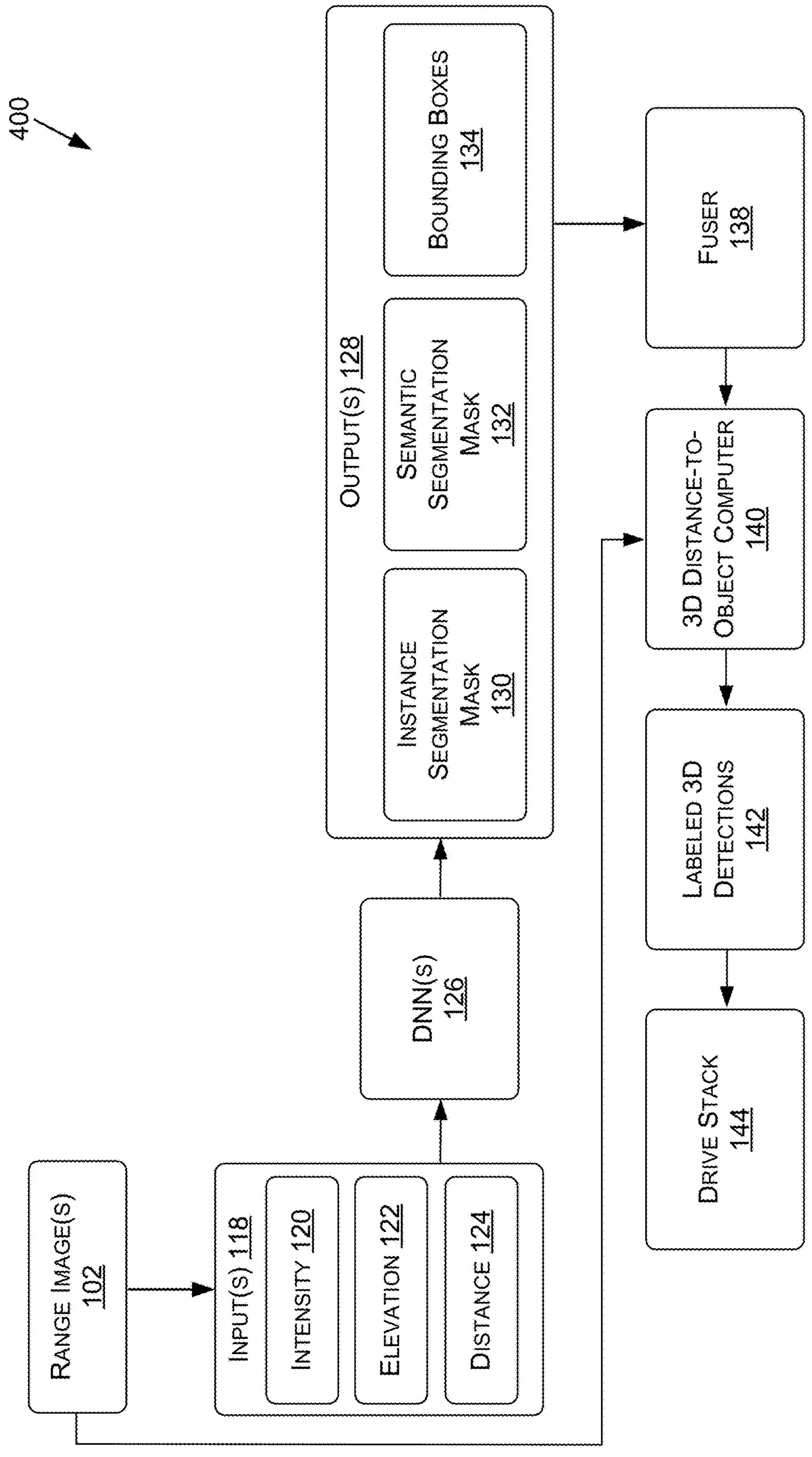
FIG. 4 is an example data flow diagram for a process of object detection and classification using a DNN, in accordance with some embodiments of the present disclosure.

With reference to FIG. 4, FIG. 4 is an example data flow diagram for a process 400 of detecting and classifying actors using a DNN(s), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 400 may include sensor data from any number and any type of sensor, such as, without limitation, LiDAR sensors 864, RADAR sensors 860, cameras 868, 870, 872, etc., and/or other sensor types such as those described herein with respect to the autonomous vehicle 800 of FIGS. 8A-8D. For example, the sensors may include one or more sensors of an ego-object or ego-actor—such as LiDAR sensor(s) 864 of the autonomous vehicle 800 of FIGS. 8A-8D—and the sensors may be used to generate sensor data representing objects in the 3D environment around the ego-object.

In examples where LiDAR data is used, object detection and classification may be performed using LiDAR data from one or more LiDAR sensors 864. Generally, a LiDAR system may include a transmitter that emits pulses of laser light. The emitted light waves reflect off of certain objects and materials, and one of the LiDAR sensors 864 may detect these reflections and reflection characteristics such as bearing, azimuth, elevation, range (e.g., time of beam flight), intensity, reflectivity, signal-to-noise ratio (SNR), and/or the like. Reflections and reflection characteristics may depend on the objects in the environment, speeds, materials, sensor mounting position and orientation, etc. Firmware associated with the LiDAR sensor(s) 864 may be used to control LiDAR sensor(s) 864 to capture and/or process sensor data, such as reflection data from the sensor's field of view.

Generally, the LiDAR data may include raw sensor data, LiDAR point cloud data, and/or reflection data processed into some other format. For example, reflection data may be combined with position and orientation data (e.g., from GNSS and IMU sensors) to form a point cloud representing detected reflections from the environment. Each detection in the point cloud may include a three dimensional location of the detection and metadata about the detection such as one or more of the reflection characteristics. Some non-limiting examples of LiDAR sensors include Velodyne HDL/VLS Series and Ouster OS1/OS2 Series LiDAR sensors, and a non-limiting example operating (e.g., scan) frequency may be >=5 Hz. Although these embodiments describe the sensor data as LiDAR data, the sensor data may additionally or alternatively include sensor data from other sensors, such as RADAR data (e.g., RADAR point clouds), image data (e.g., RGB images from one or more cameras mounted around an ego-actor), and/or other types. In addition, the sensor data—and specifically LiDAR data—described with respect to FIG. 4 may be similar to the sensor data used to generate the ground truth data 110 and/or to train the DNN(s) 126, as described herein with respect to FIGS. 1, 2A-2D, and 3.

The sensor data may be pre-processed into a format that the DNN(s) 126 understands. For example, in embodiments where the sensor data includes LiDAR data (and/or other data such as RADAR data), the LiDAR data (and/or other data) may be accumulated, transformed to a single coordinate system (e.g., centered around the ego-actor/vehicle), ego-motion-compensated (e.g., to a latest known position of the ego-actor/vehicle), and/or projected to form a projection image of a desired size (e.g., spatial dimension). For example, an (accumulated, ego-motion-compensated) LiDAR point cloud may be projected to form a LiDAR range image 102 with a perspective view. Any suitable perspective projection may be used (e.g., spherical, cylindrical, pinhole, etc.). In some cases, the type of projection may depend on the type of sensor. By way of non-limiting example, for spinning sensors, a spherical or cylindrical projection may be used. In some embodiments, for a time-of-flight camera (e.g., Flash-LiDAR), a pinhole projection may be used. In another example, an (accumulated, ego-motion-compensated) RADAR point cloud may be orthographically projected to form an overhead image with a desired ground sampling distance. In any event, the projection image (e.g., the LiDAR range image) and/or other reflection data may be stored and/or encoded into a suitable representation (e.g., the inputs 118), which may serve as the input into the DNN(s) 126.

As an example, raw sensor data may be generated and pre-processing may be executed on the sensor data to generate the range images 102 and/or the inputs 118 corresponding thereto. In some embodiments, the sensor data may be accumulated (which may include transforming to a single coordinate system), ego-motion-compensated, and/or encoded into a suitable representation such as a projection image (e.g., a LiDAR range image 102) and/or a tensor, for example, with multiple channels storing different reflection characteristics.

More specifically, the sensor data—such as LiDAR data—may be accumulated from multiple sensors, such as some or all of a plurality of surrounding LiDAR sensor(s) 864 from different locations of the autonomous vehicle 800, and may be transformed to a single vehicle coordinate system (e.g., centered around the vehicle). Additionally or alternatively, the sensor data may be accumulated over time in order to increase the density of the accumulated sensor data. Sensor detections may be accumulated over any desired window of time (e.g., 0.5 seconds (s), Is, 2*s*, etc.). The size of the window may be selected based on the sensor and/or application (e.g., smaller windows may be selected for noisy applications such as highway scenarios). As such, each input 118 into the DNN(s) 126 may be generated from accumulated detections from each window of time from a rolling window (e.g., from a duration spanning from t-window size to present). Each window to evaluate may be incremented by any suitable step size, which may but need not correspond to the window size. Thus, each successive input into the DNN(s) 126 may be based on successive windows, which may but need not be overlapping.

In some embodiments, ego-motion-compensation may be applied to the sensor data. For example, accumulated detections may be ego-motion-compensated to the latest known vehicle position. More specifically, locations of older detections may be propagated to a latest known position of the moving vehicle, using the known motion of the vehicle to estimate where the older detections will be located (e.g., relative to the present location of the vehicle) at a desired point in time (e.g., the current point in time). The result may be a set of accumulated, ego-motion compensated sensor data (e.g., a LiDAR point cloud) for a particular time slice.

In some embodiments, the (accumulated, ego-motion compensated) sensor data may be encoded into a suitable representation such as a projection image, which may include multiple channels storing different features such as reflection characteristics. More specifically, accumulated, ego-motion compensated detections may be projected to form a projection image of a desired size (e.g., spatial dimension). Any desired view of the environment may be selected for the projection image, such as a top down view, a front view, a perspective view, and/or others. In one example, a LIDAR point cloud may be projected (e.g., spherical, cylindrical, pinhole) to form a LiDAR range image 102 with a perspective view of the environment, and the LiDAR range image may be used as the inputs 118 to the DNN(s) 126. In some embodiments, images with the same or different views may be generated, with each image being input into a separate channel of DNN(s) 126. By way of non-limiting example, different sensors (whether the same type or a different of sensor) may be used to generate image data (e.g., LiDAR range image, camera images, etc.) having the same (e.g., perspective) view of the environment in a common image space, and image data from different sensors or sensor modalities may be stored in separate channels of a tensor. These are meant simply as examples, and other variations may be implemented within the scope of the present disclosure.

Since image data may be evaluated as an input to the DNN(s) 126, there may be a tradeoff between prediction accuracy and computational demand. As such, a desired spatial dimension for a projection image may be selected as a design choice. Additionally or alternatively, to reduce the loss of data resulting from lower image resolutions, a dimension of a projection image may be based on a characteristic of a corresponding sensor that captured the sensor data. By way of non-limiting example, the height (or vertical resolution) of a LiDAR range image 102 may be set to correspond with the number of horizontal scan lines of the sensor capturing the sensor data (e.g., one row of pixels in the range image per scan line of a corresponding LiDAR sensor), and the elevation 122 may be capped at the vertical resolution. The width (or horizontal resolution) of a LiDAR range image 102 may be set based on the horizontal resolution of the sensor (e.g., the degrees—such as 180, 360, etc.—of the field of view or sensory field of the sensor) capturing the sensor data.

In some embodiments, a projection image may include multiple layers, with pixel values for the different layers storing different reflection characteristics. In embodiments, for each pixel that bins sensor data representing multiple reflections, a set of features may be calculated, determined, or otherwise selected from reflection characteristics of the reflections (e.g., bearing, azimuth, elevation, range or distance, intensity, reflectivity, SNR, etc.). For example, In some cases, when sensor data representing multiple reflections is binned together in a pixel of a projection image (e.g., a range image 102), sensor data representing one of the reflections (e.g., the reflection with the closest range) may be represented in the projection image and the sensor data representing the other reflections may be dropped. For example, in a range image with a pixel that bins multiple reflections together, the pixel may store a range value corresponding to the reflection with the closest range—e.g., corresponding to an object or surface that is closest to the sensor of the vehicle 800. Additionally or alternatively, when there are multiple reflections binned together in a pixel, thereby forming a tower of points, a particular feature for that pixel may be calculated by aggregating a corresponding reflection characteristic for the multiple overlapping reflections (e.g., using standard deviation, average, etc.). Generally, any given pixel may have multiple associated features values, which may be stored in corresponding channels of a tensor. In any event, the sensor data may be encoded into a variety of types of the inputs 118 (e.g., a projection image such as a LiDAR range image 102, a tensor encoding a projection image(s) and corresponding reflection characteristics, etc.), and input data representative thereof may serve as the inputs 118 into the DNN(s) 126. For example, as illustrated in FIG. 4, the inputs 118 may include intensity 120, elevation 122, and/or distance 124, which may correspond to encoded values of the range image(s) 102.

The inputs 118 may be applied to the DNN(s) 126, and the DNN(s) 126 may compute the outputs 128 based on the inputs 118. For example, the DNN(s) 126 may compute the outputs as one or more channels—e.g., a first channel corresponding to the instance segmentation mask 130, a second channel corresponding to the semantic segmentation mask 132, and/or a third channel corresponding to the bounding boxes 134. In some embodiments, the output channels of the DNN(s) 126 may be from a single head or stream of layers of the DNN(s) 126, while in other embodiments, two or more heads or streams of layers (e.g., one head or stream per output type) may be used to generate the different outputs 128. In such embodiments, there may a common trunk or stream of layers—such as feature extractor layers tasked with computing feature maps corresponding to the inputs 118—that output and pass data to the separate heads or streams of layers of the DNN(s) 126.

The instance segmentation mask 130 may include per-pixel values corresponding to unique actor instances detected by the DNN(s) 126. For example, each pixel associated with a first object or actor may have an associated confidence or value that indicates the value 1.0, each pixel associated with a second object or actor may have an associated confidence or value that indicates the value of 2.0, and so on. As another example, the instance segmentation mask 130 may be output as values corresponding to a regression vector (e.g., dx/dy) pointing to a center of an instance—e.g., a pixel corresponding to the centroid of an instance. One or more pixels may point to the same centroid, or the same instance, and post-processing may be executed to determine a final pixel location for a centroid of an instance. This process may be repeated for each unique instance to determine the number of instances and a location of the unique instances in the range image 102 (and thus in the LiDAR point cloud after transfer thereto).

The semantic (or class) segmentation mask 132 may include per-pixel values corresponding to classes of detected actors, objects, or environmental features (e.g., drivable free-space) detected by the DNN(s) 126. For example, each pixel associated an object, actor, or environmental feature may have a confidence value indicting the class of the object (e.g., car, truck, pedestrian, cyclist, tree, pole, building, drivable free-space, road boundary, etc.). For example, each pixel may have an associated confidence for each class that the DNN(s) 126 is trained to detect, and the highest confidence may be determined to be the class associated with the pixel after post-processing. In some embodiments, where no confidence values are above a threshold confidence, the pixel may be determined to not be associated with any of the classes that the DNN(s) 126 is trained to detect.

The bounding boxes (or more generally, bounding shapes) 134 may include values for pixels that generate bounding box proposals. For example, some or all of the pixels may have confidence values that the pixel is a centroid of a bounding box 134, in addition to dimension and orientation information. For example, a pixel may have associated values of an (x, y) location in the range image 102 corresponding to a centroid (or vertex(ices)) of the bounding box 134 and a height and width of the bounding box 134 (e.g., a pixel height and a pixel width). This information may be used to reconstruct the bounding boxes 134 in the range image 102 and/or to ultimately transfer or unproject the bounding box 134 from the range image 102 to the 3D LiDAR point cloud that was used to generate the range image 102. Although a centroid and/or dimensions of the bounding shapes are identified as the output format for the bounding boxes 134, this is not intended to be limiting. For example, in other embodiments, the bounding boxes 134 may be regressed using offset vectors (e.g., dx/dy vectors from a current pixel to a pixel corresponding to a closest edge of a bounding box 134, or to each closest edge in two or more directions, etc.), and the regressed values may be post-processed to reconstruct the bounding boxes 134. Other suitable bounding box 134 output formats are also contemplated herein.

Figure 5:
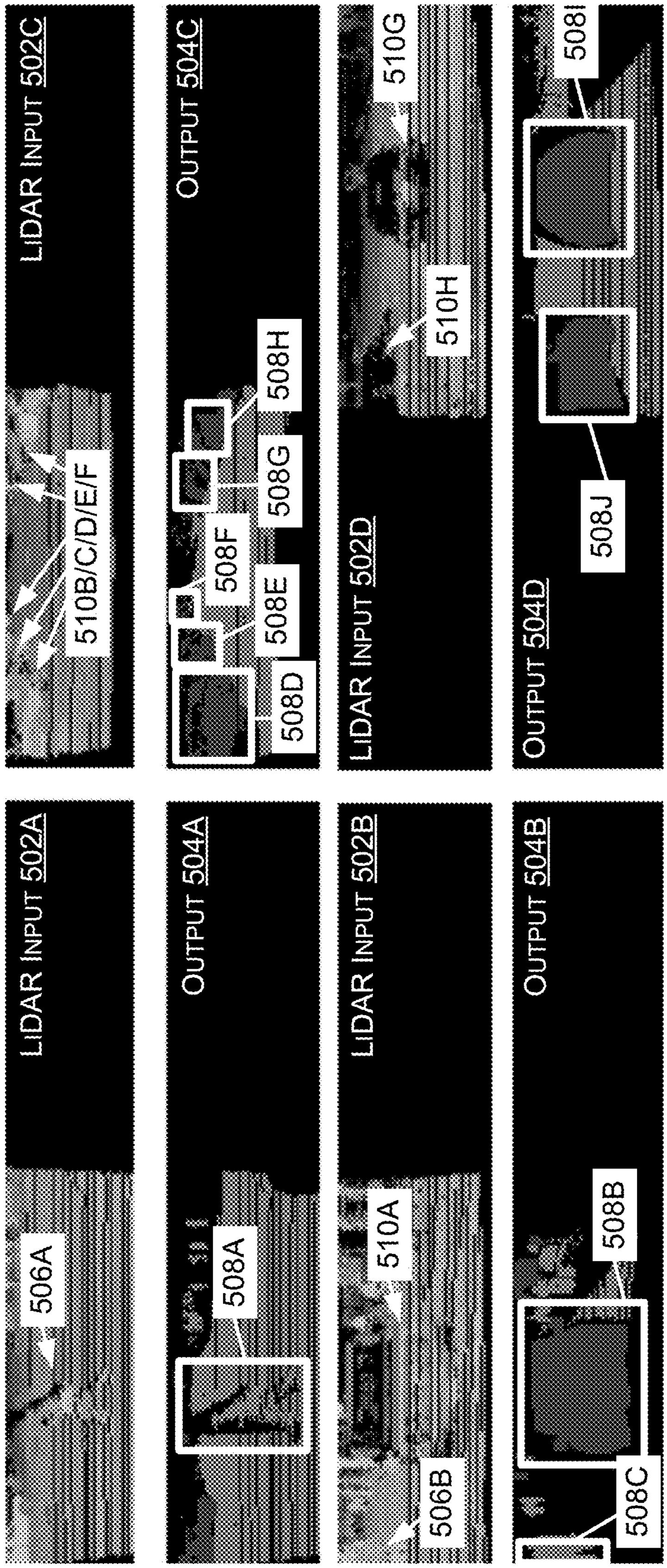
FIG. 5 depicts example inputs to a DNN and corresponding computed outputs of the DNN, in accordance with some embodiments of the present disclosure.

As examples, and with respect to FIG. 5, various example LiDAR inputs 502 corresponding to range images 102 provided as input to the DNN(s) 126 and corresponding example outputs 504 as computed by the DNN(s) 126 are illustrated. For example, the LiDAR input 502A may depict or represent a pedestrian 506A walking across a street. As such, the output 504A may include a bounding box 508A corresponding to the pedestrian 506A and a segmentation mask (e.g., a semantic segmentation mask 132) with values indicating that the pedestrian 506A is a pedestrian for the pixels corresponding to the pedestrian 506A and/or values indicating that the street—or portions thereof—correspond to drivable free-space. Similarly, the LiDAR input 502B may depict or represent a pedestrian 506B and a vehicle 510A. As such, the output 504B may include a bounding box 508B corresponding to the vehicle 510A, a bounding box 508C corresponding to the pedestrian 506B, and a segmentation mask (e.g., a semantic segmentation mask 132, an instance segmentation mask 130, etc.) with values indicating that the pedestrian 506B is a pedestrian, the vehicle 510A is a vehicle, and/or values indicating that the street—or portions thereof—correspond to drivable free-space. Where an instance segmentation mask 130 is also output, the values may correspond to a first unique actor instance for pixels corresponding to the vehicle 510A and a second unique actor instance for pixels corresponding to the pedestrian 506B. As another example, the LiDAR input 502C may depict or represent vehicles 510B-510F. As such, the output 504C may include bounding box 508D-H corresponding to the vehicles 510B-510F, respectively, and a segmentation mask (e.g., a semantic segmentation mask 132, an instance segmentation mask 130, etc.) with values indicating that the vehicles 510B-510F are vehicles, and/or values indicating that the street—or portions thereof—correspond to drivable free-space. Where an instance segmentation mask 130 is also output, the values may correspond to a unique actor instance for pixels corresponding to each unique vehicle 510B-510F. As yet another example, the LiDAR input 502D may depict or represent vehicles 5101 and 510J. As such, the output 504DC may include bounding box 5081 and 508J corresponding to the vehicles 510G and 510H, respectively, and a segmentation mask (e.g., a semantic segmentation mask 132, an instance segmentation mask 130, etc.) with values indicating that the vehicles 510G and 510H are vehicles, and/or values indicating that the street—or portions thereof—correspond to drivable free-space. Where an instance segmentation mask 130 is also output, the values may correspond to a unique actor instance for pixels corresponding to each unique vehicle 510G and 510H. In some embodiments, such as where an instance segmentation mask 130 is not output by the DNN(s) 126, the bounding boxes 508, the class segmentation mask 132, and/or a combination thereof may be used to determine unique actor instances, as described herein.

Referring again to FIG. 4, the outputs 128 may undergo a fusing operation using fuser 138. For example, the outputs 128 may be fused together and co-processed with the range image 102—or data determined therefrom—to obtain 3D distance-to-object estimates using 3D distance-to-object computer. Using the 3D distance-to-object determinations for each object, labeled 3D detections 142 may be generated in the 3D LiDAR point cloud. For example, the fuser may determine the pixels corresponding to a particular class or instance, and a bounding box corresponding thereto, and may transfer the pixel locations of the range image 102 to the corresponding points in the 3D LiDAR point cloud. The points that are determined from the pixels associated with a same instance may then undergo post-processing, in embodiments, such as by applying geometric constraints to filter out points that may not actually correspond to the instance (e.g., using RANSAC, or another algorithm, similar to the description herein with respect to FIG. 1). Once a final set of points are determined, the distance or depth values associated with each of the points may be used, by the 3D distance-to-object computer 140, to determine a centroid of the object in the 3D LiDAR point cloud and/or an orientation of the object. The bounding box 134 corresponding to the points (as determined from the pixels of the range image 102), having known dimensions from the output of the DNN(s) 126, may be unprojected or input into the point cloud at the location of the centroid, with the known dimensions, and/or at an orientation determined from the points in the 3D LiDAR point cloud. These bounding boxes in the LiDAR point cloud may correspond to the labeled 3D detections. As such, points of the LiDAR point cloud may have values encoded thereto that correspond to the instance segmentation mask 130 and/or the semantic segmentation mask 132, and the bounding boxes 134 may be unprojected from the range image 102 to the LiDAR point cloud using the processed described herein. This information may then be passed to a drive stack 144 (e.g., an autonomous driving software stack of the vehicle 800) to perform any number of operations, such as object tracking, path planning, obstacle or collision avoidance, executing control decisions, and/or the like.

Figure 6A:
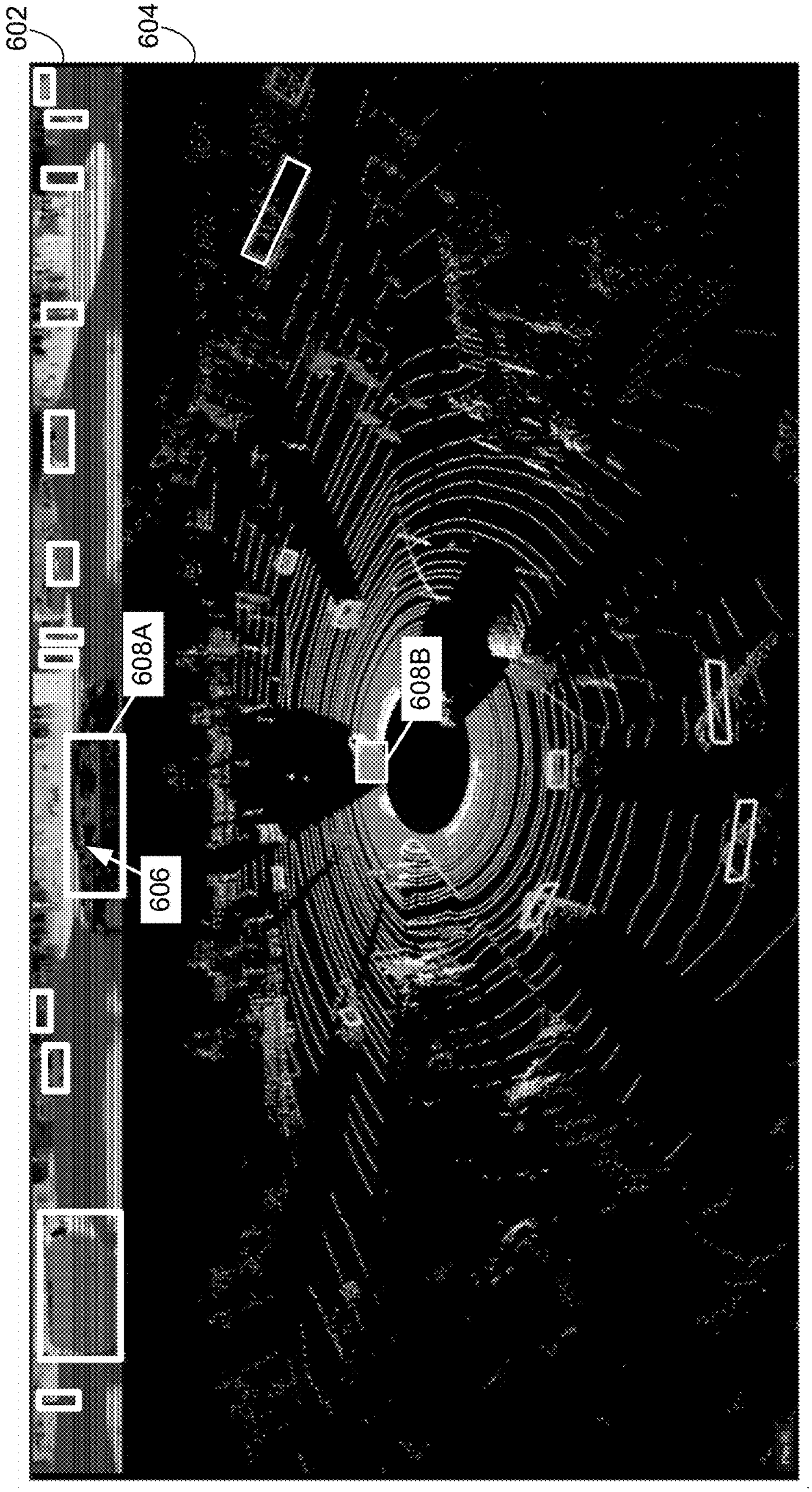
FIGS. 6A-6B depict example outputs of a DNN corresponding to a LiDAR range image, and labeled detections in a LiDAR point cloud generated therefrom, in accordance with some embodiments of the present disclosure.
Figure 6B:
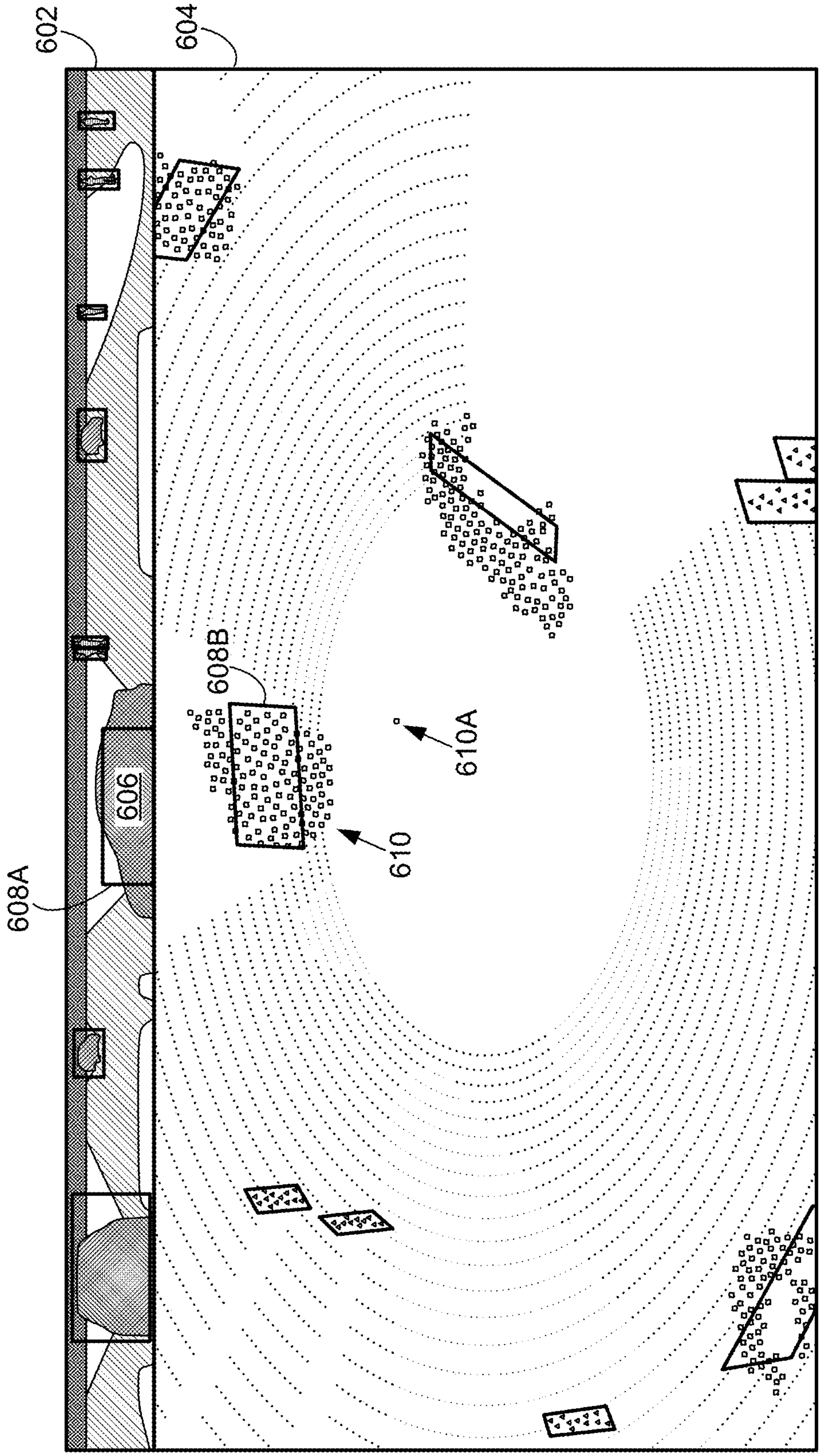

As an example, and with reference to FIGS. 6A and 6B, outputs 128 of the DNN(s) 126 corresponding to a LiDAR range image 602 and corresponding outputs in a LiDAR point cloud are illustrated. FIG. 6A may correspond to an actual output of the DNN(s) 126 and an actual point cloud, while FIG. 6B may correspond to a simplified illustration of the same. For example, the outputs 128 corresponding to the range image 602 may include various bounding boxes 134 corresponding to actors, instance segmentation masks 130 corresponding to the actors, and/or semantic segmentation masks 132 corresponding to the actors and/or environment features or objects. For clarity purposes, outputs corresponding to one actor are described herein with respect to FIGS. 6A and 6B; however, the processes described with respect to the actor may be executed for any and/or all actors detected by the DNN(s) 126.

A car 606 may be detected in the range image 602 using the DNN(s) 126, and the outputs 128 may include pixel values for some group of pixels of the range image 602 that indicate that the car 606 is in fact a car (e.g., based on the semantic segmentation mask 132), that the car is a unique instance (e.g., based on the instance segmentation mask 130), and/or the location and/or dimension of a bounding shape 608A corresponding to the car 606. As such, the cluster or group of pixels corresponding to the car 606—as determined using the instance segmentation mask 130 and/or the semantic segmentation mask 132—may be used to determine the corresponding depth values with the range image 602. This information may then be used to determine points 610 (depicted as squares for illustrative purposes only) in the LiDAR point cloud 604 that correspond to the car 606. These points 610 may then be post-processed, in embodiments, to determine a final set of points. For example, using a geometric constraint corresponding to a car or vehicle class, it may be determined that point 610A is an outlier (e.g., the point 610A falls outside of a geometric constraint of the car 606), and the point 610A may be removed from the set of points 610 used to determine the location, position, pose, and/or orientation of the car 606 in the LiDAR point cloud 604. As such, once the final set of points 610 is determined, the data encoded to the points 610 may be used to determine a centroid of the car 606 in the LiDAR point cloud 604. In addition to a location of the centroid, an orientation, direction, and/or other pose information corresponding to the car 606 may be determined, and the bounding shape 608A may be unprojected from the range image 602 to the LiDAR point cloud 604 to generate bounding shape 608B. As such, the bounding shape 608B may be inserted such that the centroid of the bounding shape 608B lines up with the computed centroid of the car 606 in the LiDAR point cloud 604, and may be inserted with the pose information in mind (e.g., the bounding shape 608 may be inserted perpendicular to the heading of the car 606). This process may be repeated for each object.

Figure 7:
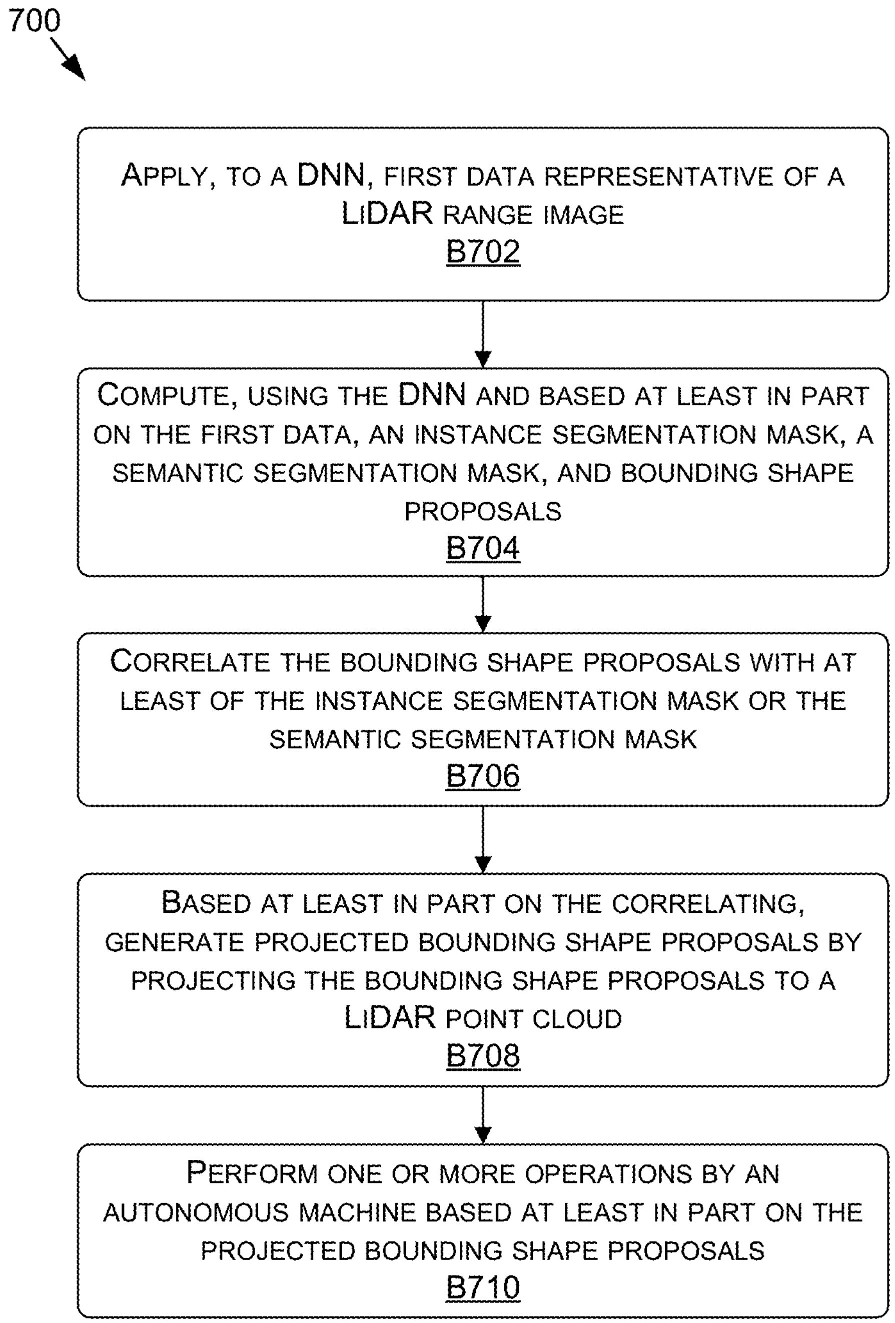
FIG. 7 is a flow diagram showing a method for object detection and classification using a LiDAR range image, in accordance with some embodiments of the present disclosure.

Now referring to FIG. 7, each block of method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, method 700 is described, by way of example, with respect to the process 400 of FIG. 4. However, this method 700 may additionally or alternatively be executed by any one process or system, or any combination of processes or systems, including, but not limited to, those described herein.

FIG. 7 is a flow diagram showing a method 700 for object detection and classification using a LiDAR range image, in accordance with some embodiments of the present disclosure. The method 700, at block B702, includes applying, to a DNN, first data representative of a LiDAR range image. For example, the inputs 118 may be applied to the DNN(s) 126.

The method 700, at block B704, includes computing, using the DNN and based at least in part on the first data, an instance segmentation mask, a semantic segmentation mask, and bounding shape proposals. For example, the DNN(s) 126 may compute one or more of the outputs 128.

The method 700, at block B706, includes correlating the bounding shape proposals with at least one of the instance segmentation mask or the semantic segmentation mask. For example, the fuser 138 may correlate or fuse the outputs 128.

The method 700, at block B708, includes, based at least in part on the correlating, generating projected bounding shape proposals by projecting the bounding shape propels to a LiDAR point cloud. For example, the fused outputs—in addition to the data from the range image 102—may be used by the 3D distance-to-object computer 140 to determine depths in the LiDAR point cloud corresponding to pixels of the range image 102 that correspond to unique actor instances. This information may then be used to determine a centroid of the object or actor in the LiDAR point cloud, and to insert or unproject the bounding boxes 134 as labeled 3D detections 142 in the LiDAR point cloud.

The method 700, at block B710, includes performing one or more operations by an autonomous machine based at least in part on the projected bounding shape proposals. For example, the labeled 3D detections may be used by the drive stack 144 to perform one or more operations.

Example Autonomous Vehicle

Figure 8A:
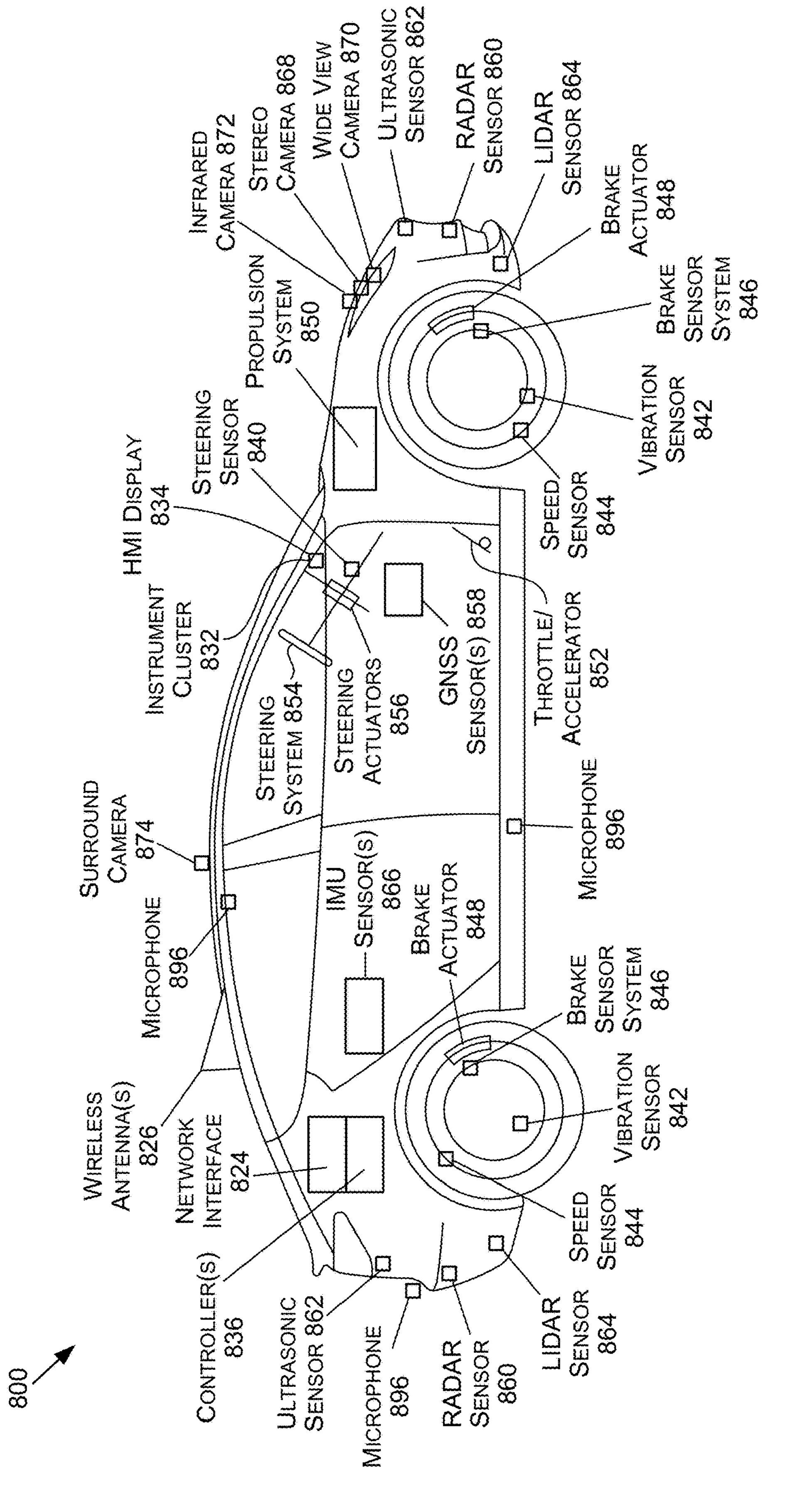
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LiDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s)

872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
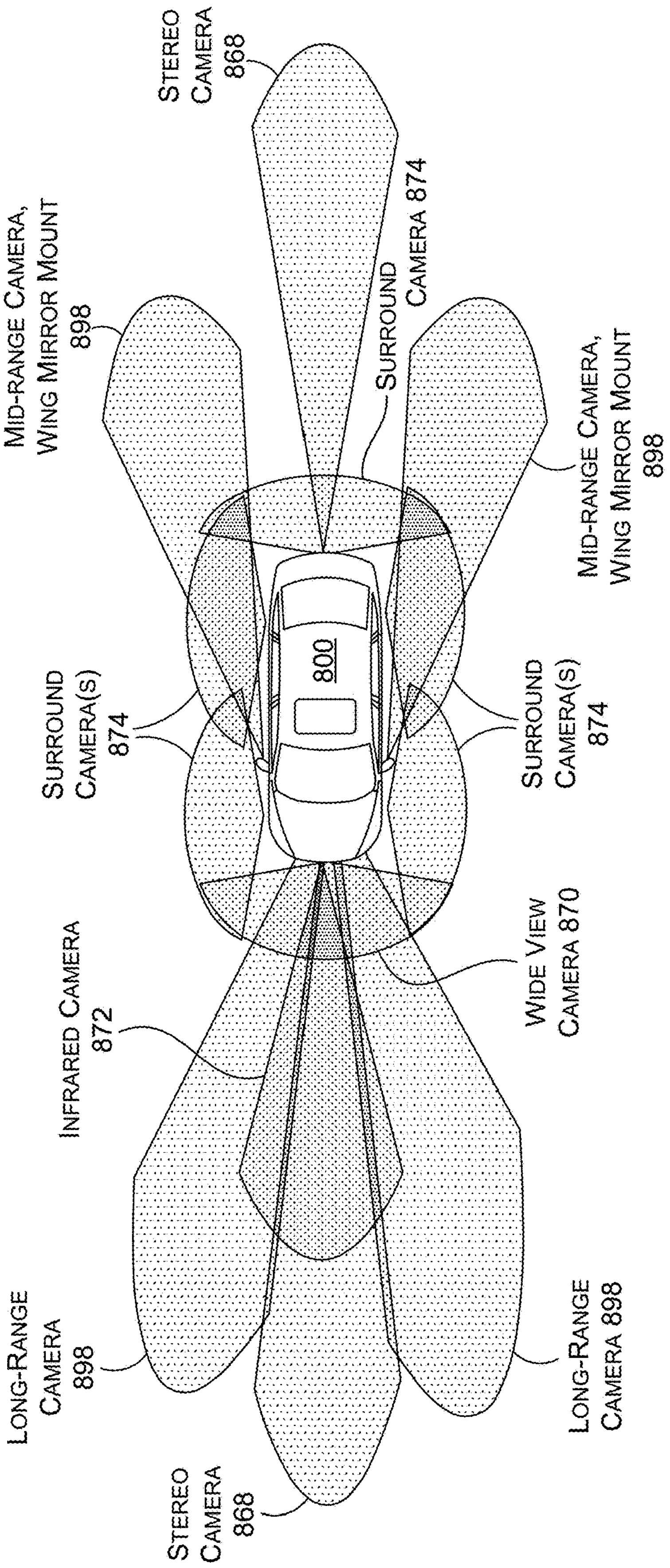
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
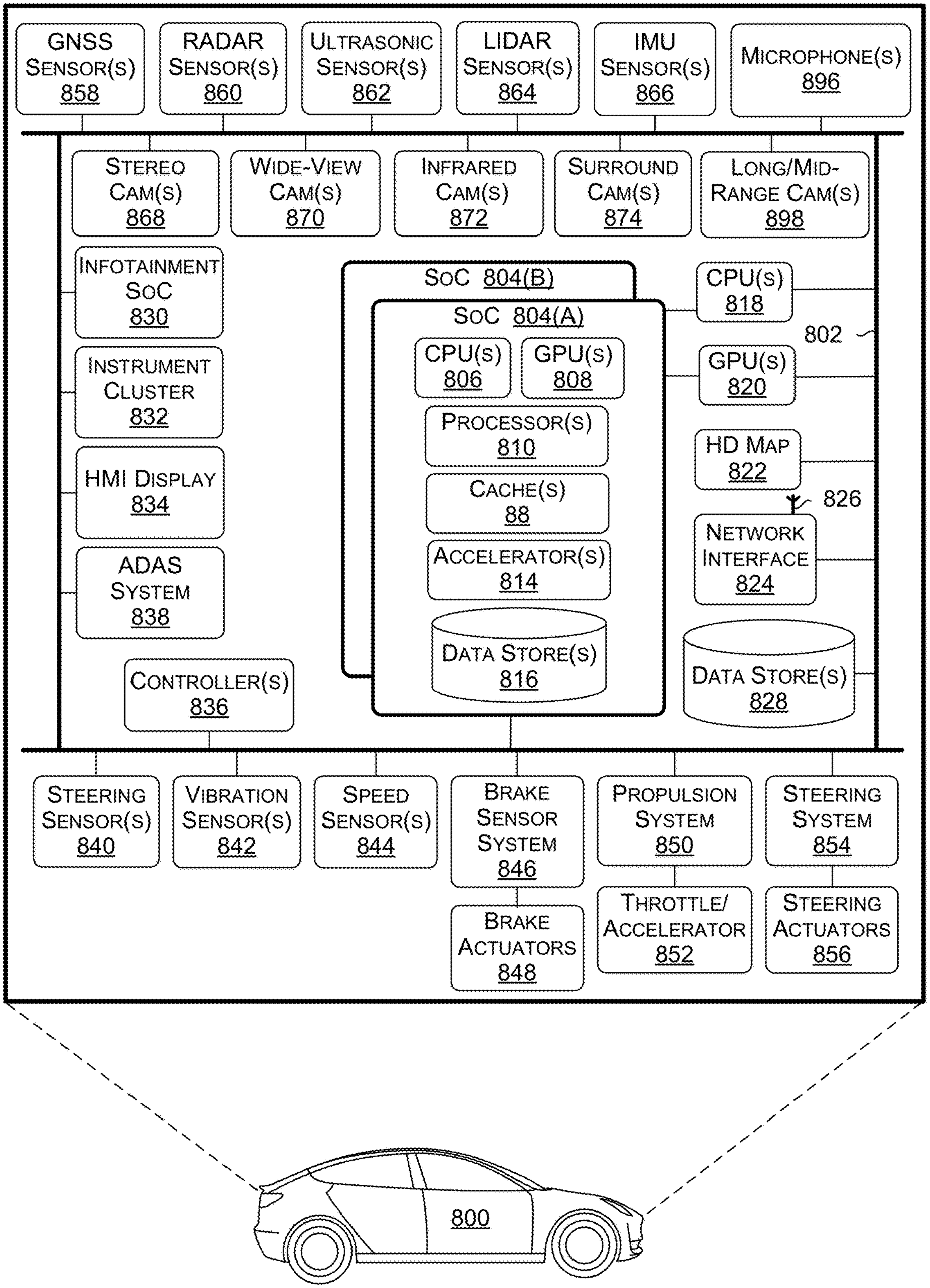
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LiDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LiDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LiDAR sensor(s) 864. The LiDAR sensor(s) 864 may be used for object and pedestrian detection, emergency braking, collision avoidance, and/or other functions. The LiDAR sensor(s) 864 may be functional safety level ASIL B. In some examples, the vehicle 800 may include multiple LiDAR sensors 864 (e.g., two, four, six, etc.) that may use Ethernet (e.g., to provide data to a Gigabit Ethernet switch).

In some examples, the LiDAR sensor(s) 864 may be capable of providing a list of objects and their distances for a 360-degree field of view. Commercially available LiDAR sensor(s) 864 may have an advertised range of approximately 800 m, with an accuracy of 2 cm-3 cm, and with support for a 800 Mbps Ethernet connection, for example. In some examples, one or more non-protruding LiDAR sensors 864 may be used. In such examples, the LiDAR sensor(s) 864 may be implemented as a small device that may be embedded into the front, rear, sides, and/or corners of the vehicle 800. The LiDAR sensor(s) 864, in such examples, may provide up to a 120-degree horizontal and 35-degree vertical field-of-view, with a 200 m range even for low-reflectivity objects. Front-mounted LiDAR sensor(s) 864 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 800. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LiDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
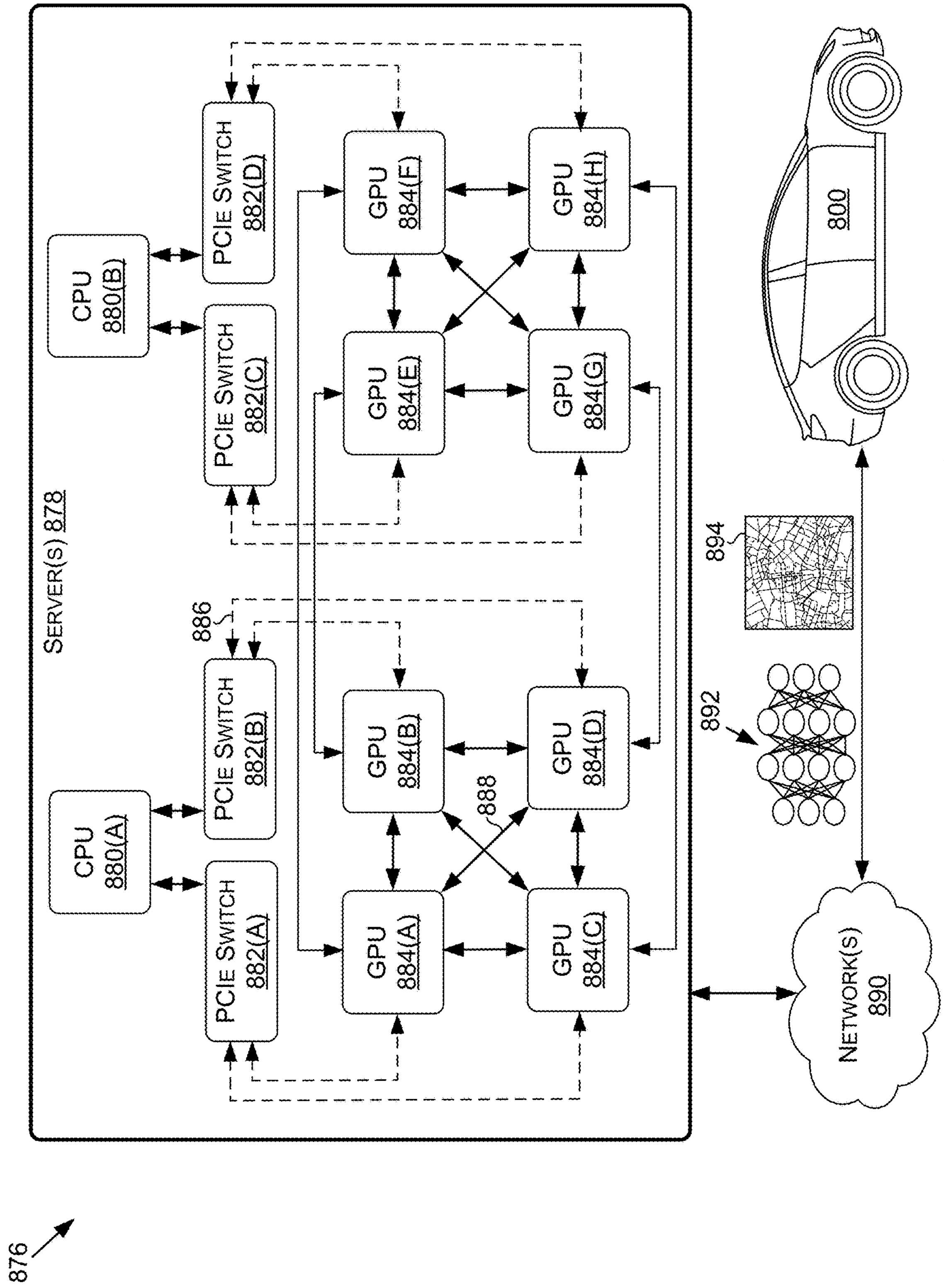
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
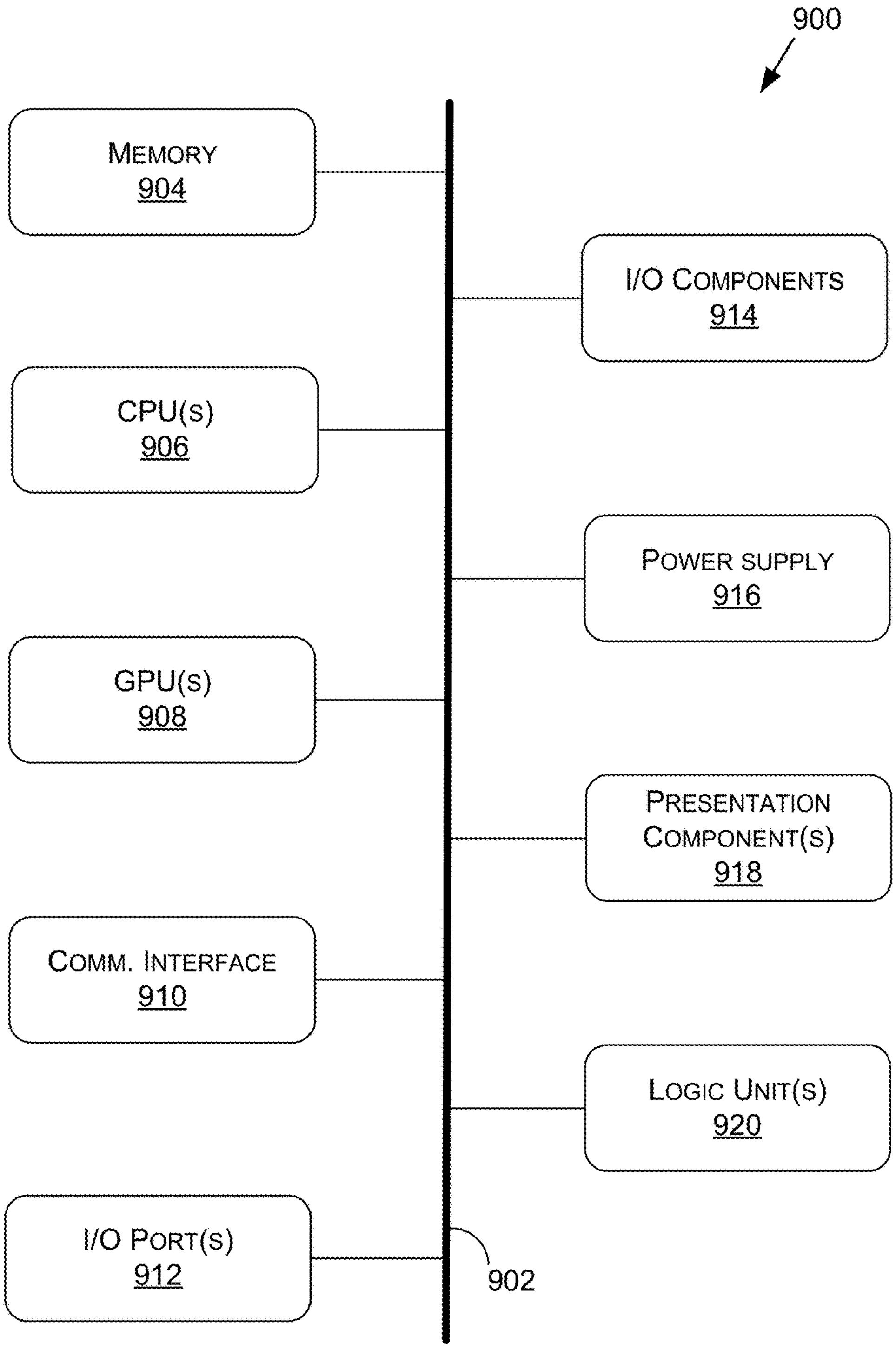
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client—server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Example Data Center

Figure 10:
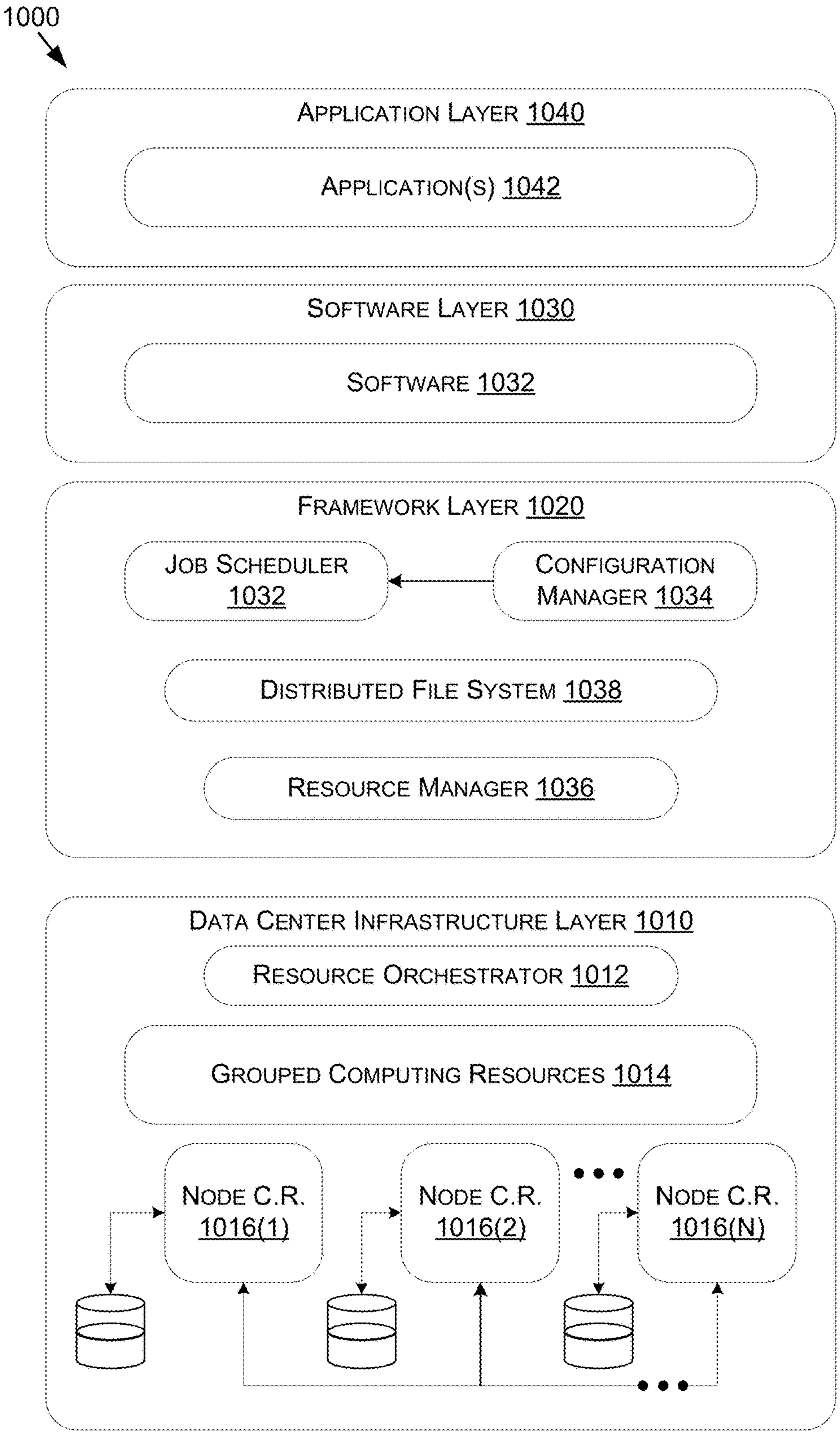
FIG. 10 is a block diagram of an example data center suitable for use in implementing some embodiments of the present disclosure.

FIG. 10 illustrates an example data center 1000, in which at least one embodiment may be used. In at least one embodiment, data center 1000 includes a data center infrastructure layer 1010, a framework layer 1020, a software layer 1030 and an application layer 1040.

In at least one embodiment, as shown in FIG. 10, data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1016(1)-1016(N) may be a server having one or more of above-mentioned computing resources.

In at least one embodiment, grouped computing resources 1014 may include separate groupings of node C.R.s housed within one or more racks (not shown), or many racks housed in data centers at various geographical locations (also not shown). Separate groupings of node C.R.s within grouped computing resources 1014 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1022 may configure or otherwise control one or more node C.R.s 1016(1)-1016(N) and/or grouped computing resources 1014. In at least one embodiment, resource orchestrator 1022 may include a software design infrastructure ("SDI") management entity for data center 1000. In at least one embodiment, resource orchestrator may include hardware, software or some combination thereof.

In at least one embodiment, as shown in FIG. 10, framework layer 1020 includes a job scheduler 1032, a configuration manager 1034, a resource manager 1036 and a distributed file system 1038. In at least one embodiment, framework layer 1020 may include a framework to support software 1032 of software layer 1030 and/or one or more application(s) 1042 of application layer 1040. In at least one embodiment, software 1032 or application(s) 1042 may respectively include web-based service software or applications, such as those provided by Amazon Web Services, Google Cloud and Microsoft Azure. In at least one embodiment, framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. In at least one embodiment, configuration manager 1034 may be capable of configuring different layers such as software layer 1030 and framework layer 1020 including Spark and distributed file system 1038 for supporting large-scale data processing. In at least one embodiment, resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. In at least one embodiment, resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. In at least one embodiment, self-modifying actions may relieve a data center operator of data center 1000 from making possibly bad configuration decisions and possibly avoiding underutilized and/or poor performing portions of a data center.

In at least one embodiment, data center 1000 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1000. In at least one embodiment, trained machine learning models corresponding to one or more neural networks may be used to infer or predict information using resources described above with respect to data center 1000 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

processing, using a neural network, a converted representation of sensor data generated from an initial representation of the sensor data to determine:

one or more segmentation masks representing one or more portions of the converted representation of the sensor data that correspond to one or more object classes; and one or more first locations within the converted representation of the sensor data of one or more first bounding shapes corresponding to one or more objects;

correlating the one or more first bounding shapes with the one or more segmentation masks;

generating, based at least on the correlating and using the one or more first bounding shapes, one or more second locations within the initial representation of the sensor data of one or more second bounding shapes corresponding to the one or more objects; and performing one or more operations using a machine based at least on the one or more second locations of the one or more second bounding shapes.

2. The method of claim 1, further comprising:

obtaining the initial representation of the sensor data obtained using one or more sensors of the machine; and generating, based at least on the sensor data, the converted representation of the sensor data.

3. The method of claim 1, wherein the generating the one or more second locations of the one or more second bounding shapes associated with the initial representation comprises:

projecting, based at least on the correlating, the one or more first locations of the one or more first bounding shapes from the converted representation to the initial representation; and generating, based at least on the projecting, the one or more second locations of the one or more second bounding shapes.

4. The method of claim 1, further comprising:

processing, using the neural network, the converted representation of the sensor data to determine one or more second segmentation masks corresponding to one or more instances of the one or more objects in the converted representation, wherein the generating the one or more second locations of the one or more second bounding shapes is further based at least on the one or more second segmentation masks.

5. The method of claim 1, wherein the converted representation of the sensor data represents information associated with one or more points, the information including at least one of:

one or more intensity values associated with the one or more points;

one or more elevation values associated with the one or more points; or one or more distance values associated with the one or more points.

6. The method of claim 1, wherein:

the converted representation of the sensor data comprises a range image; and the initial representation of the sensor data comprises a point cloud.

7. The method of claim 1, wherein:

the one or more first locations of the one or more first bounding shapes indicate one or more points of the converted representation that correspond to the one or more objects in the converted representation; and the one or more segmentation masks indicate the one or more object classes associated with at least the one or more points.

8. The method of claim 1, further comprising:

generating, based at least on the one or more segmentation masks corresponding to the one or more object classes, one or more class labels associated with the one or more second bounding shapes, wherein the performing the one or more operations is further based at least on the one or more class labels.

9. The method of claim 1, wherein the correlating at least a first bounding shape of the one or more first bounding shapes with a segmentation mask of the one or more segmentation masks comprises:

determining that one or more first points associated with the first bounding shape correspond to one or more second points associated with the segmentation mask; and correlating the first bounding shape with the segmentation mask based at least on the one or more first points corresponding to the one or more second points.

10. A system comprising:

one or more processors to:

process, using a neural network, a converted representation of sensor data generated from an initial representation of the sensor data to determine:

one or more segmentation masks corresponding to one or more objects represented by the converted representation of the sensor data, and one or more first locations within the converted representation of the sensor data of one or more first bounding shapes corresponding to one or more objects;

correlate the one or more first bounding shapes with the one or more segmentation masks;

generate, based at least on the correlation and using the one or more first bounding shapes, one or more second locations within the initial representation of the sensor data of one or more second bounding shapes corresponding to the one or more objects; and perform one or more operations using a machine based at least on the one or more second locations of the one or more second bounding shapes.

11. The system of claim 10, wherein the one or more processors are further to:

obtain the sensor data obtained using one or more sensors of the machine; and generate, based at least on the sensor data, the converted representation of the sensor data.

12. The system of claim 10, wherein the generation of the one or more second locations of the one or more second bounding shapes associated with the initial representation comprises:

projecting, based at least on the correlation, the one or more first locations of the one or more first bounding shapes from the converted representation to the initial representation; and generating, based at least on the projecting, the one or more second locations of the one or more second bounding shapes.

13. The system of claim 10, wherein the one or more segmentation masks comprise at least one of:

one or more instance segmentation masks indicating whether one or more points correspond to the one or more objects; or one or more semantic segmentation masks indicating one or more object classes associated with the one or more points.

14. The system of claim 10, wherein the converted representation of the sensor data represents information associated with one or more points, the information including at least one of:

one or more intensity values associated with the one or more points;

one or more elevation values associated with the one or more points; or one or more distance values associated with the one or more points.

15. The system of claim 10, wherein:

the converted representation of the sensor data comprises a range image; and the initial representation of the sensor data comprises a point cloud.

16. The system of claim 10, wherein the one or more processors are further to:

generate, based at least on the correlation, one or more class labels associated with the one or more second bounding shapes, wherein the one or more operations are further to be performed based at least on the one or more class labels.

17. The system of claim 10, wherein the system is comprised in at least one of:

a control system for an autonomous or semi-autonomous machine;

a perception system for an autonomous or semi-autonomous machine;

a system for performing simulation operations;

a system for performing deep learning operations;

a system implemented using an edge device;

a system implemented using a robot;

a system for generating synthetic data;

a system incorporating one or more virtual machines (VMs);

a system implemented at least partially in a data center; or a system implemented at least partially using cloud computing resources.

18. One or more processors comprising processing circuitry to:

correlate one or more first locations within a projection image of one or more first bounding shapes associated with one or more objects with one or more segmentation masks associated with the one or more objects as represented in the projection image;

project, based at least on the correlation, the one or more first locations of the one or more first bounding shapes from the projection image to one or more second locations of one or more second bounding shapes within a point cloud; and cause a machine to perform one or more operations based at least on the one or more second locations of the one or more second bounding shapes.

19. The one or more processors of claim 18, wherein:

the one or more first locations of the one or more first bounding shapes indicate at least one or more first points of the projection image that correspond to the one or more objects; and the one or more segmentation masks indicate at least one or more second points of the projection image that correspond to the one or more objects.

20. The one or more processors of claim 18, wherein the one or more processors is comprised in at least one of:

a control system for an autonomous or semi-autonomous machine;

a perception system for an autonomous or semi-autonomous machine;

a system for performing simulation operations;

a system for performing deep learning operations;

a system implemented using an edge device;

a system implemented using a robot;

a system for generating synthetic data;

a system incorporating one or more virtual machines (VMs);

a system implemented at least partially in a data center; or a system implemented at least partially using cloud computing resources.

* * * * *